United States Patent [19]
Abe et al.

[11] Patent Number: 5,579,857
[45] Date of Patent: Dec. 3, 1996

[54] STAIR CLIMBING VEHICLE

[75] Inventors: Minoru Abe, Katano; Heiji Fukutake, Toyonaka; Yasuhiko Eguchi, Neyagawa; Ryouji Wakizaka, Kobe; Kyousuke Kitazawa, Suita; Akira Takeuchi, Akashi, all of Japan

[73] Assignee: Kabushiki Kaisha Daikin Seisakusho, Osaka, Japan

[21] Appl. No.: 543,676

[22] Filed: Oct. 16, 1995

Related U.S. Application Data

[62] Division of Ser. No. 252,408, Jun. 1, 1994, Pat. No. 5,507,358.

[30] Foreign Application Priority Data

| Jun. 4, 1993 | [JP] | Japan | 5-134642 |
| Jun. 4, 1993 | [JP] | Japan | 5-134643 |
| Jun. 25, 1994 | [JP] | Japan | 5-155445 |

[51] Int. Cl.⁶ .................. B62B 5/02; B62D 57/024
[52] U.S. Cl. .................. 180/8.2; 180/907; 280/5.26; 280/DIG. 10
[58] Field of Search .............. 180/8.1, 8.2, 8.3, 180/8.4, 8.5, 907, 209; 280/5.2, 5.26, 5.28, DIG. 10

[56] References Cited

U.S. PATENT DOCUMENTS

| 3,283,839 | 11/1966 | Brown et al. | 180/8.2 |
| 4,645,222 | 2/1987 | Hester | 180/8.2 X |
| 4,790,548 | 12/1988 | Decelles et al. | 280/5.26 |
| 4,794,999 | 1/1989 | Hester | 180/8.2 X |
| 4,993,912 | 2/1991 | King et al. | 180/8.2 X |

FOREIGN PATENT DOCUMENTS

| 3422255 | 12/1985 | Germany. | |
| 58-67574 | 4/1983 | Japan | 180/8.2 |
| 59-073372 | 4/1984 | Japan. | |
| WO84/04451 | 11/1984 | WIPO. | |

*Primary Examiner*—Anne Marie Boehler
*Assistant Examiner*—F. Zeender
*Attorney, Agent, or Firm*—Shinjyu Office of Patent Attorneys

[57] ABSTRACT

A vehicle which goes up and down stairs includes a vehicle body (101), front and rear wheels (102) and (103) provided at the front and rear of the vehicle body (101), respectively, front and rear auxiliary wheels (105) and (107) for lifting up or down the front and rear wheels (102) and (103) by one step of stairs, respectively, a driving unit for driving each wheel, a pivoting unit for pivoting the front and rear auxiliary wheels (105) and (107), sensors (121) to (124) for detecting a riser portion of stairs, and a control unit (120) for controlling the driving unit and the rotating unit in accordance with results of the sensors (121) to (124). Since the vehicle goes up and down stairs by rotation of the auxiliary wheels (105) and (107), a corner portion of the step of stairs is not damaged while the vehicle goes up and down stairs.

2 Claims, 27 Drawing Sheets

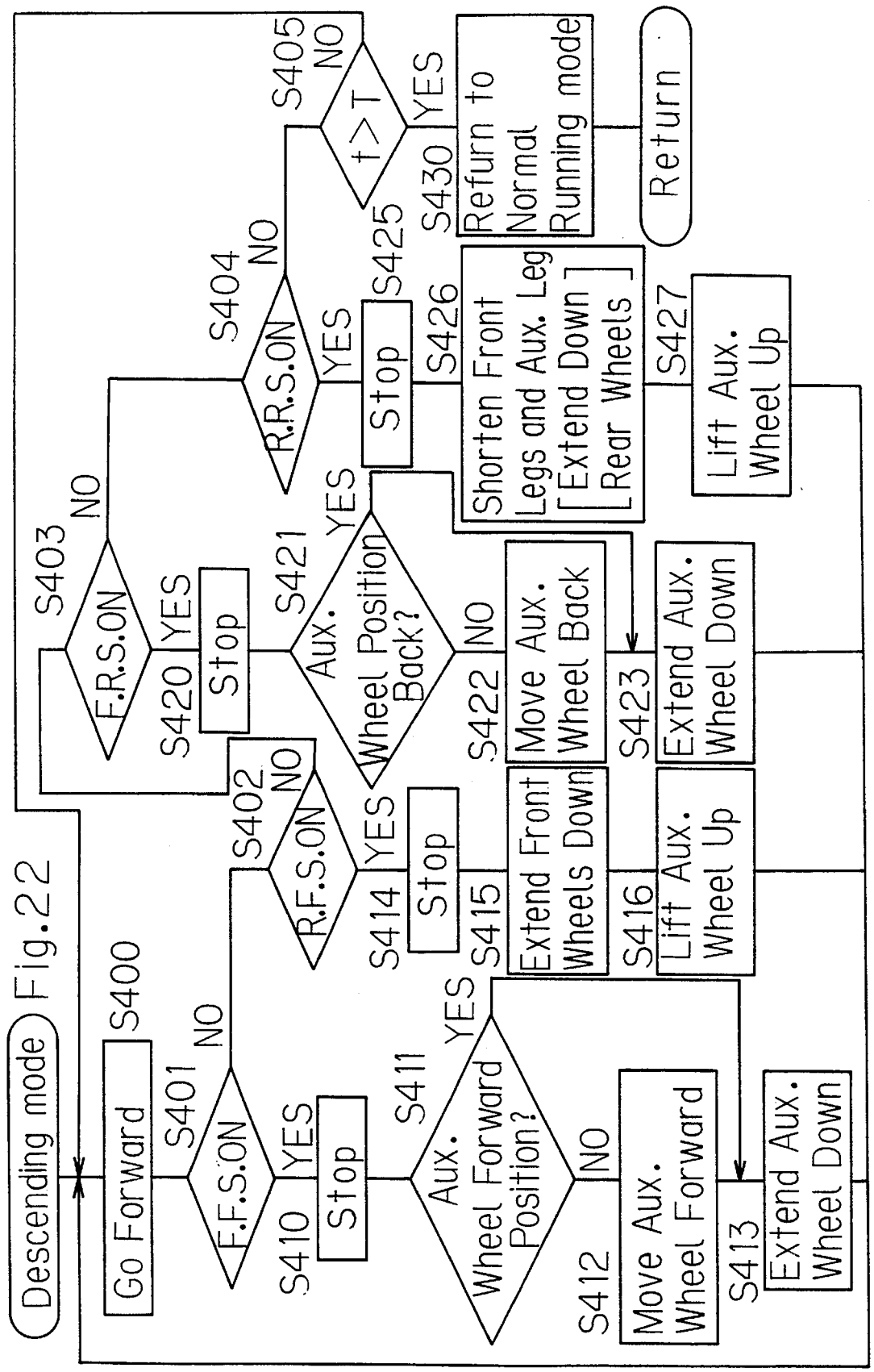

STAIR CLIMBING VEHICLE

This application is a division of application Ser. No. 08/252,408, filed Jun. 1, 1994, now U.S. Pat. No. 5,507,358.

BACKGROUND OF THE INVENTION

The present invention relates to a wheelchair vehicle and more specifically, to a wheelchair vehicle capable of climbing up or down stairs.

Vehicles capable of negotiating a flight of stairs are known. Such vehicles are generally configured to crawl up or down the stairs. For instance, one such vehicle includes a plurality of wheels under the vehicle body, and a caterpillar track or belt disposed around the wheels. Further, hook claws are provided on the outer surface of the belt. As the belt is rotated, the hooks dig into the surface of each step, thus damaging each step as the vehicle goes up or down the stair. Such vehicles are necessarily complicated, in part because of the plurality of wheels under the vehicle body.

There have been attempts to provide such a vehicle with a mechanism which maintains the seat in a horizontal position, since the vehicle body itself is inclined when going up or down a set of stairs. However, in order to maintain the seat in the horizontal state, the angle between the vehicle body and the seat must be maintained at the same angle as the inclination of stairs. Mechanisms which control the angle between the seat and the vehicle body are usually complicated structures that are expensive to manufacture.

SUMMARY OF THE INVENTION

The present invention relates to a wheelchair vehicle able to move up and down a plurality of stairs with little or no damage to the stairs wherein a seat in the vehicle is maintained generally in a horizontal state.

In a first embodiment of the present invention, a wheelchair vehicle includes a body having front and rear wheels, and front and rear auxiliary wheels. The front and rear wheels are provided at the front and rear of the vehicle body, respectively. The front and rear auxiliary wheels are mounted to the vehicle body adjacent to the front side of the front and rear wheels, respectively. Each auxiliary wheel is mounted on its own axle, each axle being vertically displaceable by a distance that is generally equal to at least the height of one step of stairs.

When the front wheels reach a riser portion of a step of stairs, the axles of the front auxiliary wheels are lowered to move the front auxiliary wheels from a height at or above the stair step to engage the top surface of the stair, thus pushing down on the stair and lifting the front wheels up. When the front wheels reach the height of the step, the vehicle moves forward. When the rear wheels reach the riser portion of a stair step, the axles of the rear auxiliary wheels are moved downward, thus causing the rear auxiliary wheels to engage the step surface and lift the rear wheels up to the step surface. Thus, step by step, the front and rear auxiliary wheels are displaced to lift up the front and rear wheels, respectively.

In a second embodiment, the wheelchair vehicle includes a vehicle body, front wheels, rear wheels, a single front auxiliary wheel and a single rear auxiliary wheel. The front wheels are mounted at the front of the vehicle body so as to be displaceable by a vertical distance generally equal to the height of at least one step of stairs. The rear wheels are mounted at the rear of the vehicle body so as to be displaceable by a vertical distance generally equal to at least two steps of stairs. The front and rear auxiliary wheels are mounted to the front and rear of the vehicle body, respectively so as to be displaceable in a vertical direction. The front and rear auxiliary wheels are configured to support the vehicle body when the front and rear wheels are separated from the surface of a stairstep.

When a stairstep is detected, the front and rear wheels and the auxiliary wheels are repetitively displaced to lifted the vehicle up or down stairs. The vehicle body is always maintained in a generally horizontal state during the stair negotiating process.

In a third embodiment the vehicle includes a vehicle body, front wheels, rear wheels and a single auxiliary wheel. The front wheels are mounted to the front of the vehicle body for movement in a vertical direction by the distance generally equal to the height of at least one step of stairs. The rear wheels are mounted to the rear of the vehicle body for movement in a vertical direction generally equal to the height of at least two steps of stairs. The auxiliary wheel is mounted to the vehicle body so as to be displaceable to and from adjacent to the front of the body and the rear of the body. The auxiliary wheel is also displaceable in a vertical direction. The auxiliary wheel supports the vehicle body when either the front or the rear wheels are separated from the surface of a stairstep.

In a fourth embodiment, the vehicle includes a vehicle body, two front axle arms, each front arm having a shaft rotatably supported by the vehicle body, and each arm formed with two generally horizontal parallel axles which extend outwardly away from the vehicle body, each axle being equidistantly spaced apart from the shaft. The vehicle is also provided with four front wheels, one wheel rotatably mounted to each axle. Two rear axle arms are rotatably mounted to the rear of the body, each arm having a shaft supported by the vehicle body, and each arm formed with two generally horizontal parallel axles which extend outwardly away from the vehicle body, similar to the front arm axles. The vehicle also includes four rear wheels, one wheel mounted to each rear axle. Typically, the axles, front and rear, are maintained in vertical alignment, such that one wheel on each arm axle is positioned above the wheel on the other arm axle.

When the front of the vehicle comes to a stair step, the front arms are rotated by 180° such that the wheel initially in the upper positioned engages the stairstep and lifts the front of the vehicle as it moves to the lower position. The process is repeated for both front and rear arms and wheels, step by step, until the vehicle reaches the top of the steps.

These and other objects and advantages of the present invention will be more fully apparent from the following detailed description.

BRIEF DESCRIPTION OF THE DRAWINGS

FIG. 22 is a operational flowchart of the vehicle depicted in FIG. 17, wherein the vehicle is in a descending mode;

DESCRIPTION OF PREFERRED EMBODIMENT

Figure 1:
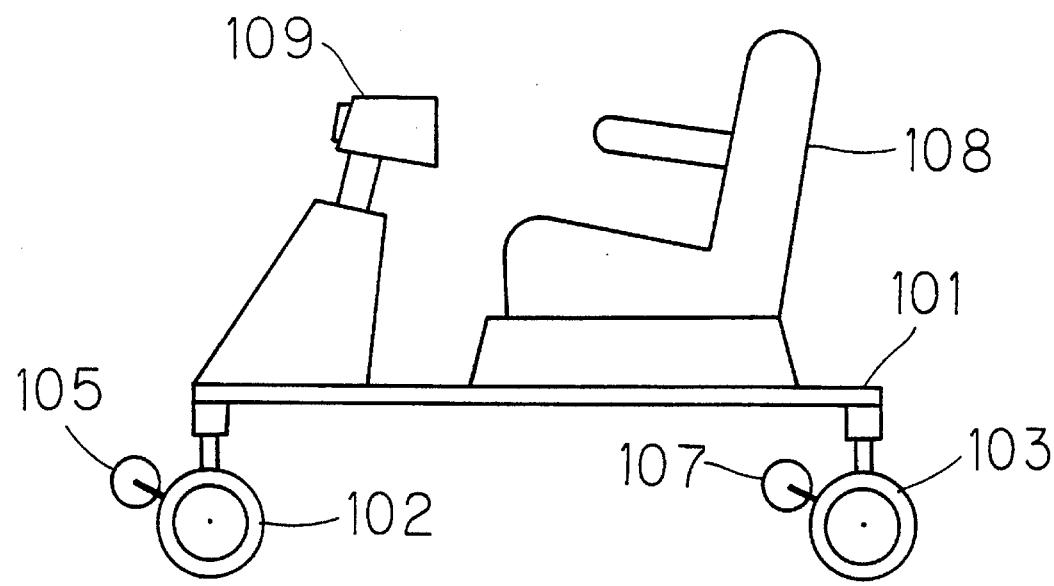
FIG. 1 is a side view of a first embodiment of a stair climbing vehicle.
Figure 2:
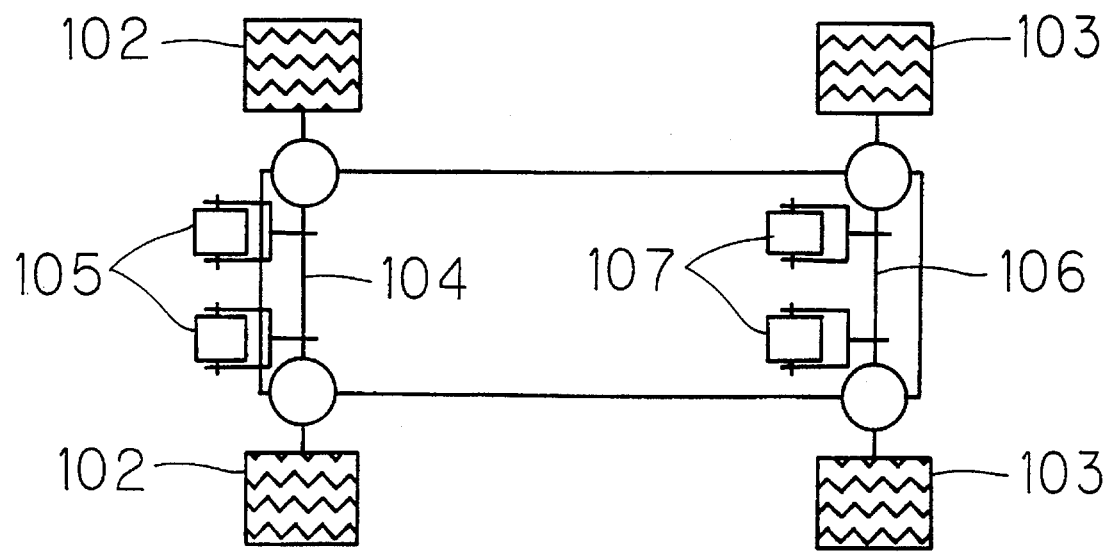
FIG. 2 is a schematic view of the underside of vehicle depicted in FIG. 1.

Referring to FIGS. 1 and 2, a vehicle for going up and down stairs includes a vehicle body 101, right and left front wheels 102 provided under a front end of the vehicle body 101, and right and left rear wheels 103 provided under a rear end thereof. A pair of front auxiliary wheels 105 is mounted to a front axle shaft 104 connecting the right and left front wheels 102. The front auxiliary wheels 105 can rotate around the front axle shaft 104 by a height corresponding to one step of stairs on the further front or rear side of the front wheels 102. In addition, a pair of rear auxiliary wheels 107 is mounted to a rear axle shaft 106 connecting the right and left wheels 103. The rear auxiliary wheels 107 can rotate around the rear axle shaft 106 by a height corresponding to one step of stairs on the further front or rear side of the rear wheels 103. In this structure, the front and rear wheels 102 and 103 can go up and down by a height corresponding to one step of stairs by rotating the front and rear auxiliary wheels 105 and 107 while abutting them onto a one-step upper step surface. Additionally, the front and rear wheels 102 and 103 and the auxiliary wheels 105 and 107 can be forwardly and reversely rotated by driving motors. A steering mechanism (not shown) is provided under the vehicle body 101, whereby the front wheels 102 can be steered.

A seat 108 and an operation panel 109 are provided on the upper surface of the vehicle body 101. The operation panel 109 includes a lever for a steering operation, a main switch, a button for selecting a running mode from among a normal running mode, an ascending mode and a descending mode, a lever for controlling a running speed, a brake switch, a display and other switches.

Figure 3:
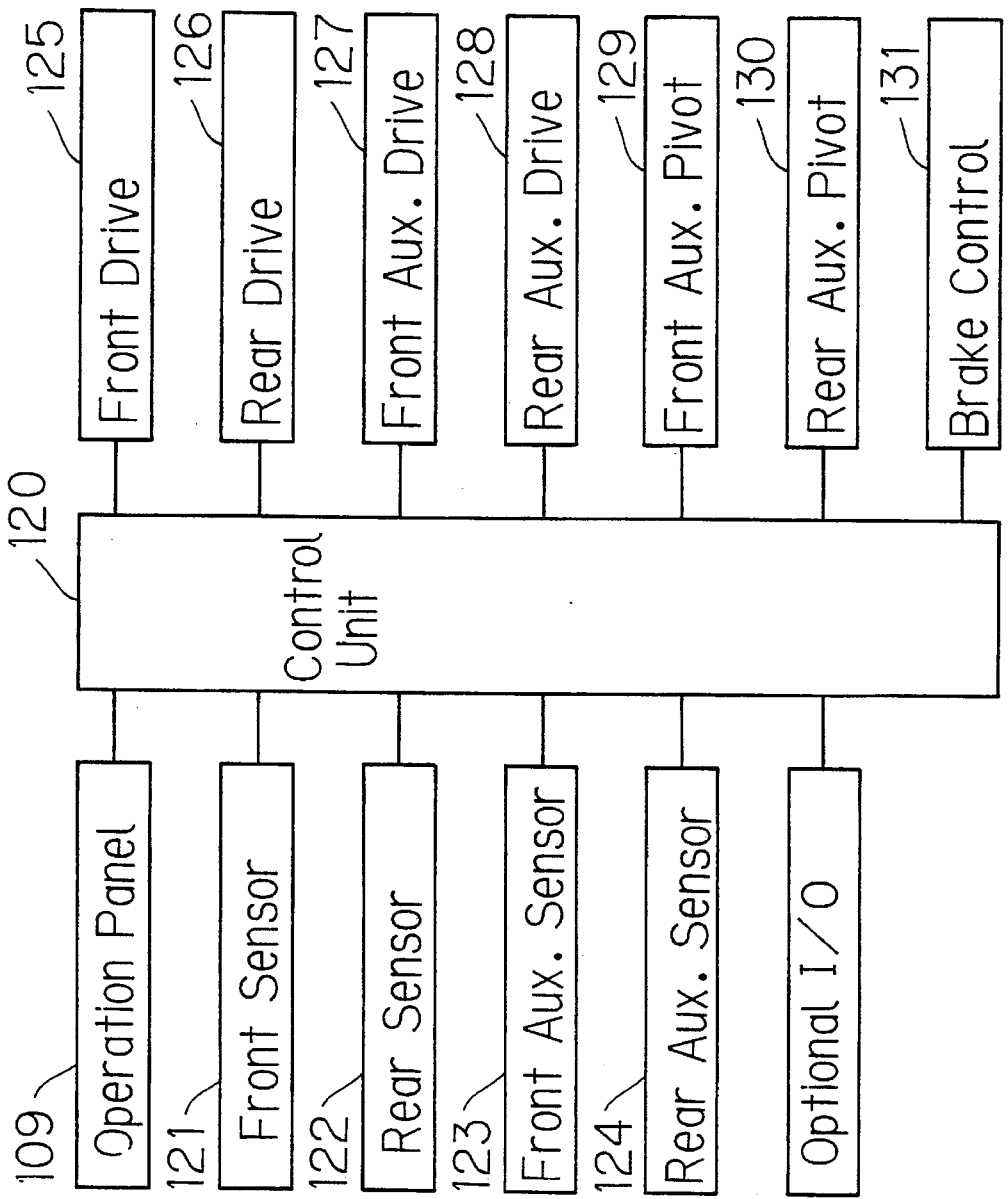
FIG. 3 is a block diagram of the electronic control circuitry of the vehicle depicted in FIG. 1.

Referring to FIG. 3, a control unit 120 is provided in the vehicle. The control unit 120 includes a microcomputer consisting of a RAM, a ROM, a CPU and associated elements. To the control unit 120 connected are the operation panel 109, a front sensor 121, a rear sensor 122, a front auxiliary sensor 123, a rear auxiliary sensor 124 and other I/O portions. Each of sensors 121 to 124 detects when each of the wheels 102, 103, 105 and 106 is close to a riser of stairs when the vehicle goes up stairs, and detects when each of the auxiliary wheels 105 and 107 is completely apart from the step of stairs when the vehicle goes down stairs. The sensors 121–124 could be any of a variety of sensors. For instance, sensors 121–124 could be displacement sensors which monitor the horizontal and vertical movement of the wheels 102, 103 104 and 106, with respect to the vehicle body 101. The front and rear auxiliary wheels 105 and 107 are pivotable about the shaft 104 and the shaft 106, respectively, toward the rear side of the wheels 102 and 103, respectively, in a stair descending operation.

The control unit 120 is electrically connected to the following, as shown in FIG. 3A: a front wheel driving unit 125 powering the front wheels 102, a rear wheel driving unit 126 powering the rear wheels 103, a front auxiliary wheel driving unit 127 powering the front auxiliary wheels 105, a rear auxiliary wheel driving unit 128 powering the rear auxiliary wheels 107, a front auxiliary wheel rotating unit 129 to pivot the front auxiliary wheels 105, a rear auxiliary wheel rotating unit 130 to pivot the rear auxiliary wheels 107, and a brake unit 131.

Figure 4:
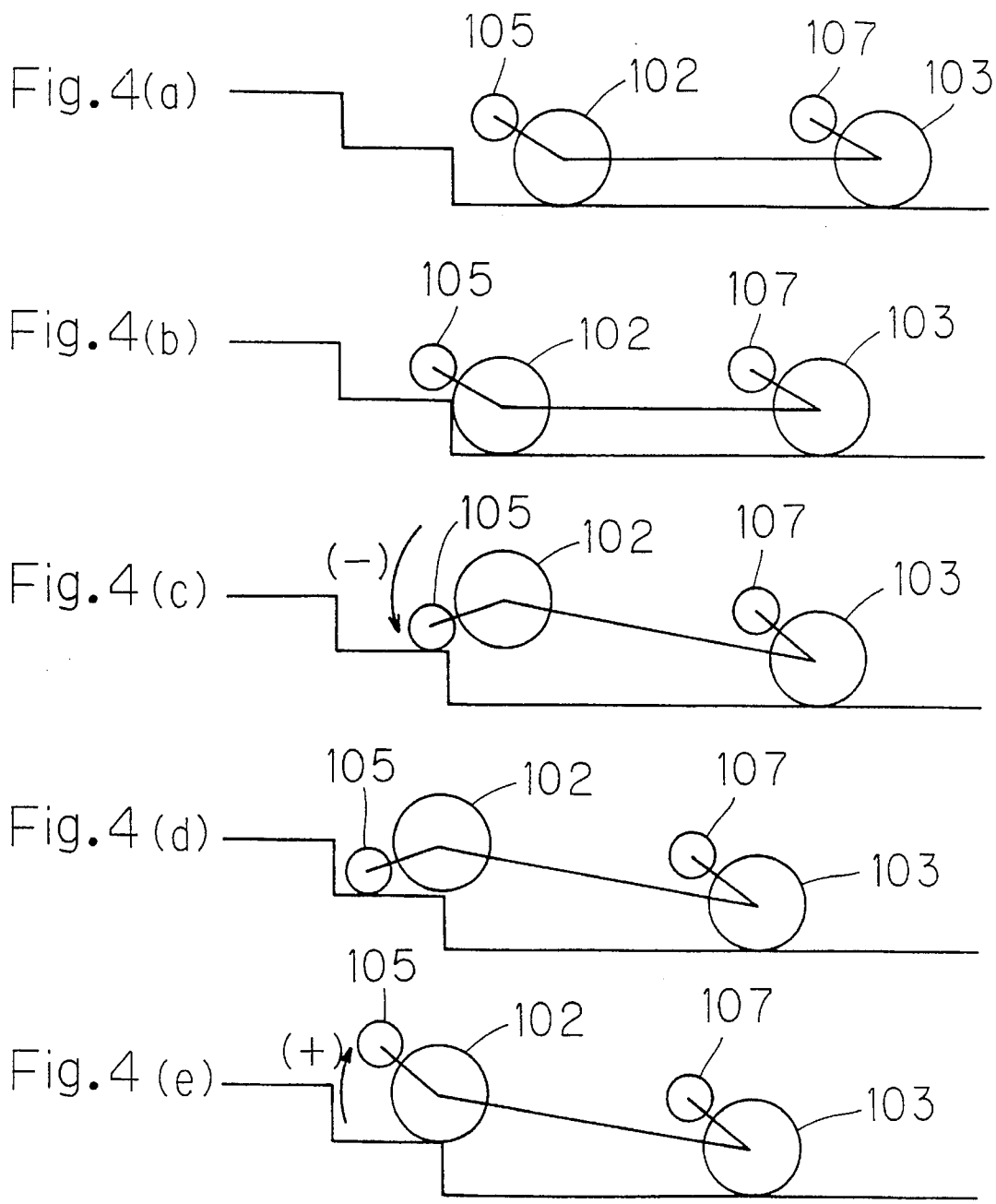
FIGS. 4(a–e) are schematic side views showing the stair climbing process of front wheels of the vehicle depicted in FIG. 1.
Figure 5:
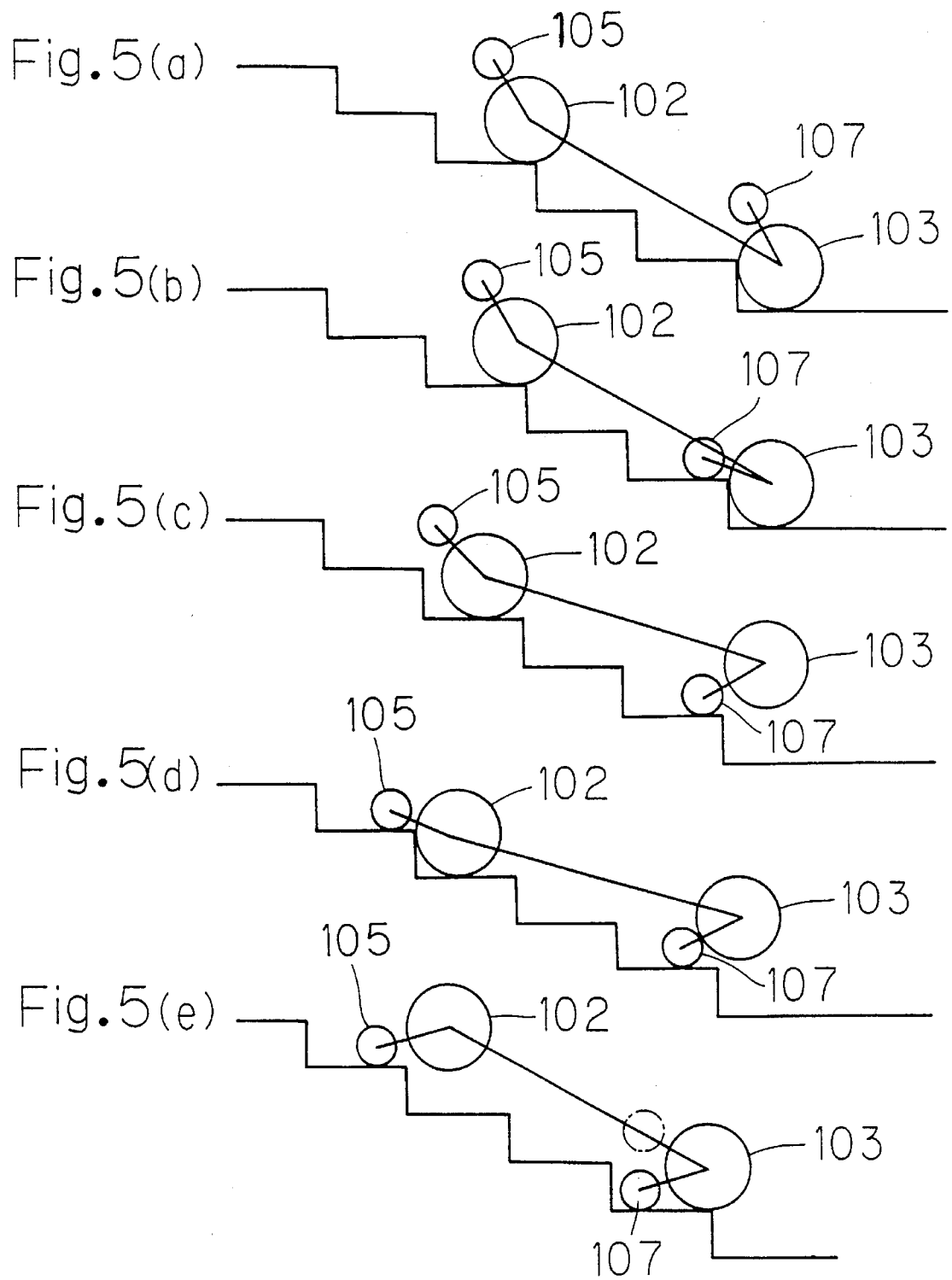
FIGS. 5(a–e) are schematic side views showing the stair climbing process of the front and rear wheels of the vehicle depicted in FIG. 1.
Figure 6:
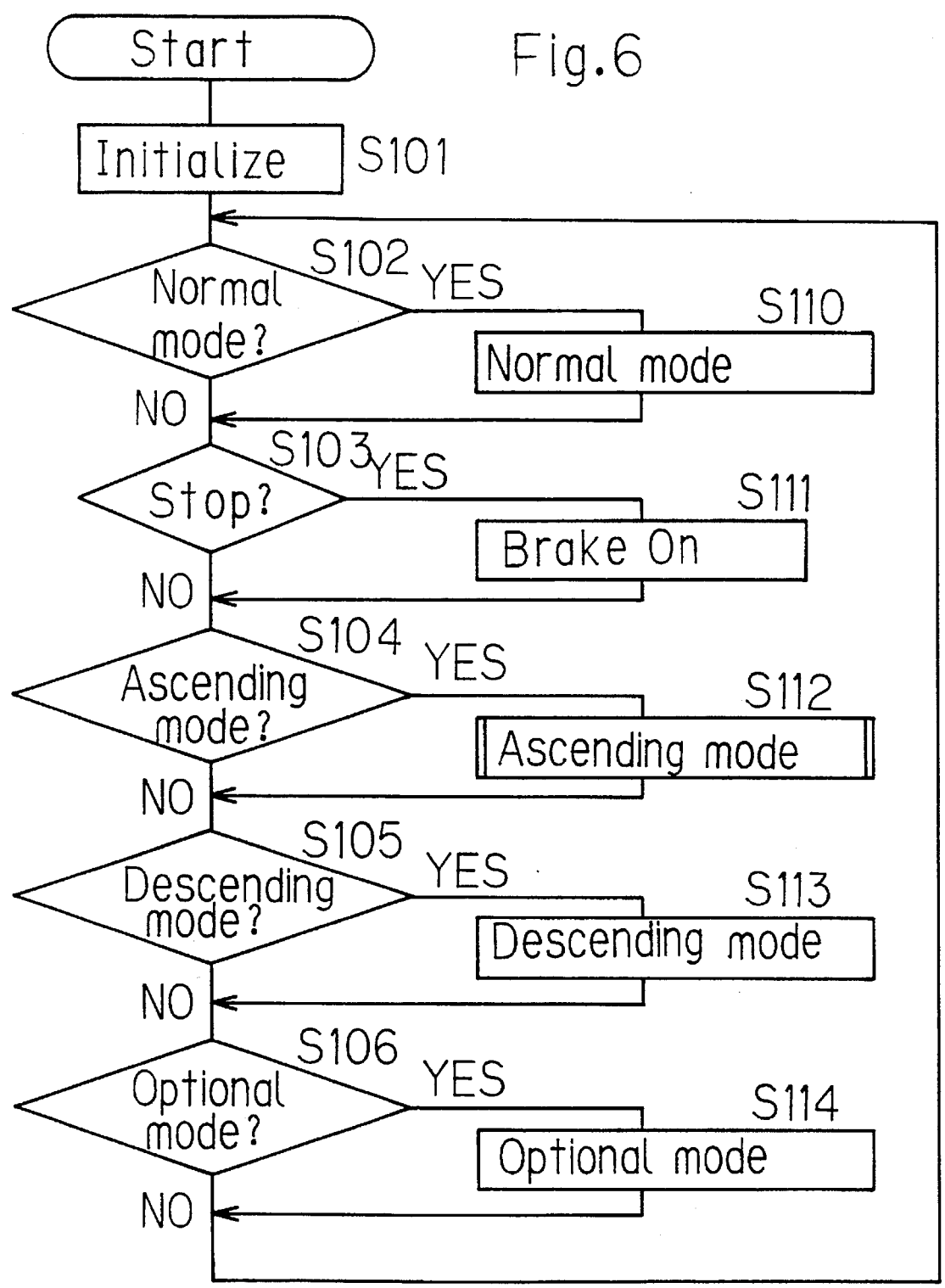
FIG. 6 is a control process flowchart of the vehicle depicted in FIG. 1.

Description will be given to a running control operation according to control process flowcharts shown in FIGS. 6 and 7, and views shown in FIGS. 4 and 5.

When the main switch on the operation panel 109 is turned on, an initialization procedure is carried out at step S101. In the initialization procedure, the running mode is set to the normal running mode, and the front and rear auxiliary wheels 105 and 107 are positioned in an elevated position, as shown in FIG. 1. Then, it is determined at step S102 whether a button specifying the normal running mode has been pressed or not. Then, it is determined at step S103 whether a stop button has been pressed or not. Then, it is determined at step S104 whether a button for going up stairs has been pressed or not. Then, it is determined at step S105 whether a button for going down stairs has been pressed or not. Then, it is determined at step S106 whether optional key has been pressed or not.

In the instance where the normal running mode button mode has been pressed, the program proceeds from step S102 to step S110, in which the normal running operation is carried out. In the normal running operation, either the front wheels 102 or the rear wheels 103 are driven to go forward or backward. If the stop button has been pressed, the program proceeds from step S103 to step S111, in which the brake unit 131 is engaged and rotation of the wheels is stopped. In the instance where the ascending mode button has been pressed, the program proceeds from step S104 to step S112, in which the ascending operation described below, is conducted. When the descending mode button has been pressed, the program proceeds from step S105 to step S113, in which the descending mode is conducted. When an optional key has been pressed, the program proceeds from step S106 to step S114, in which operation corresponding to the pressed key is carried out. Thus, the operations corresponding to each button on the operation panel 109 or manipulation of the speed lever are carried out until the main switch is turned off.

Figure 7:
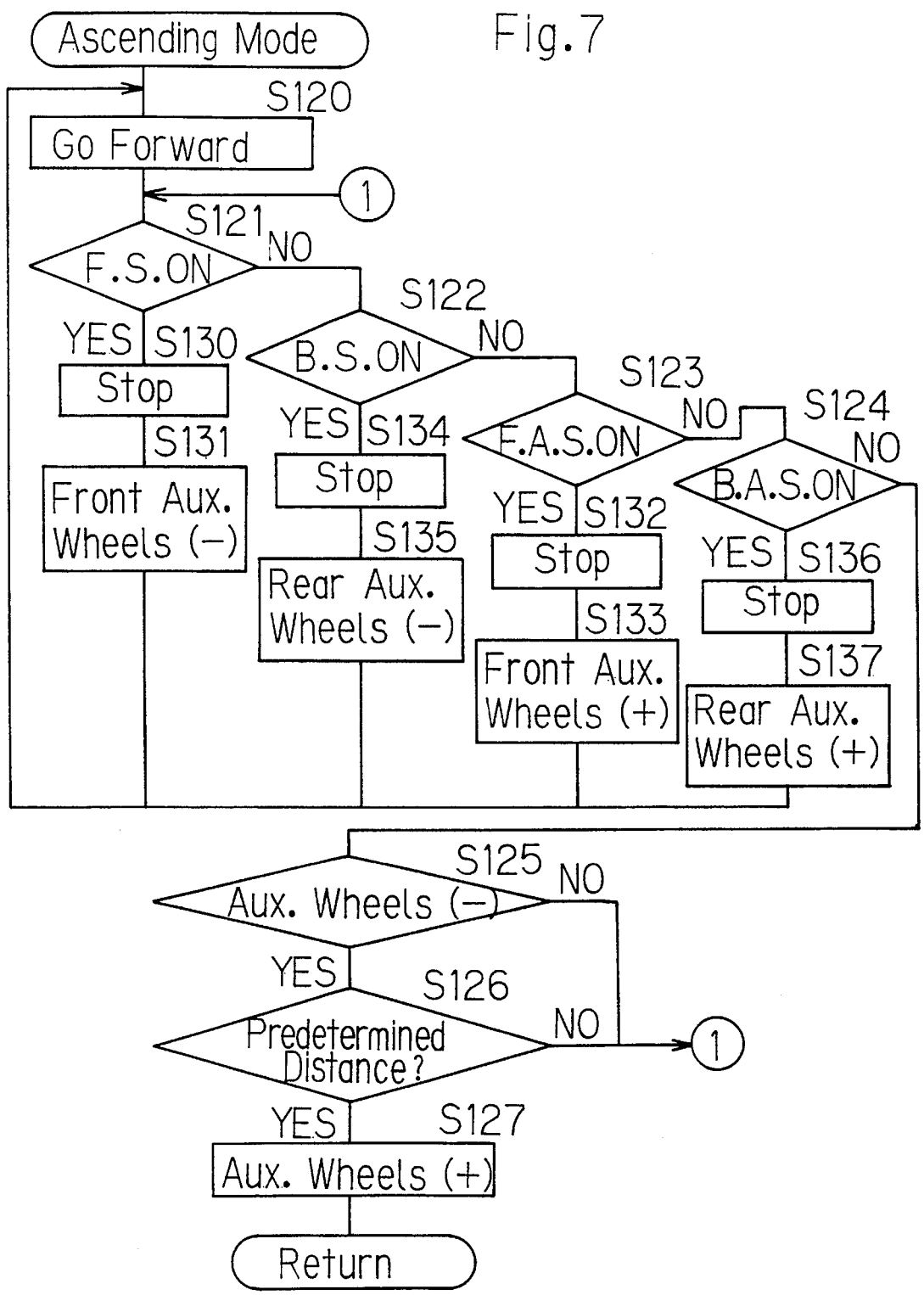
FIG. 7 is another control process flowchart of the vehicle depicted in FIG. 1.

When the ascending mode has been selected, either the front wheels 102 or rear wheels 103 are driven to go forward at step S120 shown in FIG. 7. Then, it is determined at step S121 whether the front sensor 121 has been turned on or not. The front sensor 121 is a sensor for determining whether the front wheels 102 abut on the riser portion of the stairs or not. Wherein the determination at step S121 is NO, the program proceeds to step S122. It is determined at step S122 whether the rear sensor 122 has been turned on or not. The rear sensor 122 is a sensor for determining whether the rear wheels 103 abut on the riser portion of the stairs or not. Wherein the determination at step S122 is NO, the program proceeds to step S123. Then, it is determined at step S123 whether the auxiliary sensor 123 has been turned on or not. The front auxiliary sensor 123 determines whether the front auxiliary wheels 105 are close to the riser portion of the stairs or not. The front auxiliary sensor 123 is turned on just before the front auxiliary wheels 105 abut on the riser portion of the stairs, that is, the auxiliary wheels are apart from the riser portion by a predetermined distance. Therefore, when the front auxiliary sensor 123 is turned on, the front auxiliary wheels 105 are rotated without abutting on the riser portion of stairs. Wherein the determination at step S123 is NO, the program proceeds to step S124. It is determined at S124 whether the rear auxiliary sensor 124 has been turned on or not. The rear auxiliary sensor 124 is a sensor for detecting that the rear auxiliary wheels 107 are close to the riser portion of the stairs like the front auxiliary sensor 123. Thus, operations at step S121 to step S124 are repeated to detect that the wheels 102, 103, 105 and 107 are close to the riser portion of the stairs.

Wherein the determination at step S124 is NO, the program proceeds to step S125. It is determined at step S125 whether the front and rear auxiliary wheels 105 and 107 are pivoted counterclockwise, that is, the auxiliary wheels 105 and 107 are pivoted downward from the front and rear wheels 102 and 103, respectively to touch the running surface and the auxiliary wheels rise from the surface or not. When the front and rear auxiliary wheels 105 and 107 are positioned in the initial state (front upper portion), the determination at step S125 is NO and the program returns to step S121. Meanwhile, wherein the determination at step S125 is YES, the program proceeds to step S126. It is determined at step S126 whether the vehicle goes forward by a predetermined distance or not after it is temporarily stopped and then started again during the ascending operation. More specifically, it is determined whether the vehicle goes forward by a predetermined distance or not while the front and rear auxiliary wheels 105 and 107 are grounded on the running surface. Wherein the ascending operation is completed and the wheels go on a flat running surface, the determination at step S126 is YES and then, the program proceeds to step S127, in which the auxiliary wheels 105 and 107 returns to their initial positions. Meanwhile, wherein the determination at step S126 is NO, the program returns to step S121.

Thus, the above operations are carried out until each of sensors 121 to 124 is turned on. Wherein the wheels start to go forward and reach the first riser portion of the stairs, the front wheels 102 abut on the riser portion as shown in FIG. 4A and 4B. In this case, the determination at step S121 is YES, the program proceeds to step S130. At step S130, the wheels are temporarily stopped. Then, the program proceeds to step S131, in which the front auxiliary wheels 105 are pivoted counterclockwise (−) by a predetermined angle. Thus, as shown in FIG. 4C, the front wheels 102 are lifted by one step. After the operation at step S131, the program returns to step S120 and the wheels go forward again.

Then, as shown in FIG. 4D, the front auxiliary wheels 105 come close to a second riser portion of stairs whereby the front auxiliary sensor 123 is turned on. In this case, the program proceeds from step S123 to step S132, in which the wheels are temporarily stopped. Then, at step S133, the front auxiliary wheels 105 are rotated clockwise (+), whereby the front auxiliary wheels 105 are lifted by a height corresponding to one step of stairs. After the step S133, the program returns to step S120 and the wheels go forward again.

After several iterations of the above operations, the rear wheels 103 abut the first riser portion of stairs as shown in FIG. 5A, whereby the rear sensor 122 is turned on. In this case, the program proceeds from step S122 to step S134, in which the wheels are temporarily stopped. Then, at step S135, the rear auxiliary wheels 107 are rotated counterclockwise (−) by a predetermined angle, whereby the rear wheels 103 are lifted by one step of stairs. In this state, the program returns to step S120 in which the wheels go forward again. Then, the rear wheels 103 go over the step and go forward further. Then, the rear auxiliary wheels 107 come into contact with the riser portion of stairs, whereby the rear auxiliary sensor 124 is turned on. In this case, the program proceeds from step S124 to step S136, in which the wheels are temporarily stopped. Then, at step S137, the rear auxiliary wheels are rotated clockwise (+).

By repeating the above operations, the vehicle can go up stairs while the front and rear auxiliary wheels 105 and 107 are rotated counterclockwise or clockwise by the predetermined angle.

Wherein the wheels go over the step and then go forward on the flat surface, as described above, the wheels returns to the normal running sate through the steps S125, S126 and S127.

The vehicle goes up stairs while either the front auxiliary wheels 105 or the rear auxiliary wheels 107 are pivoted clockwise or counterclockwise by a predetermined angle according to the above embodiment of the present invention. It should be understood that the vehicle may go also go up or down stairs pivoting both front and rear auxiliary wheels 105 and 107 in unison.

Figure 8:
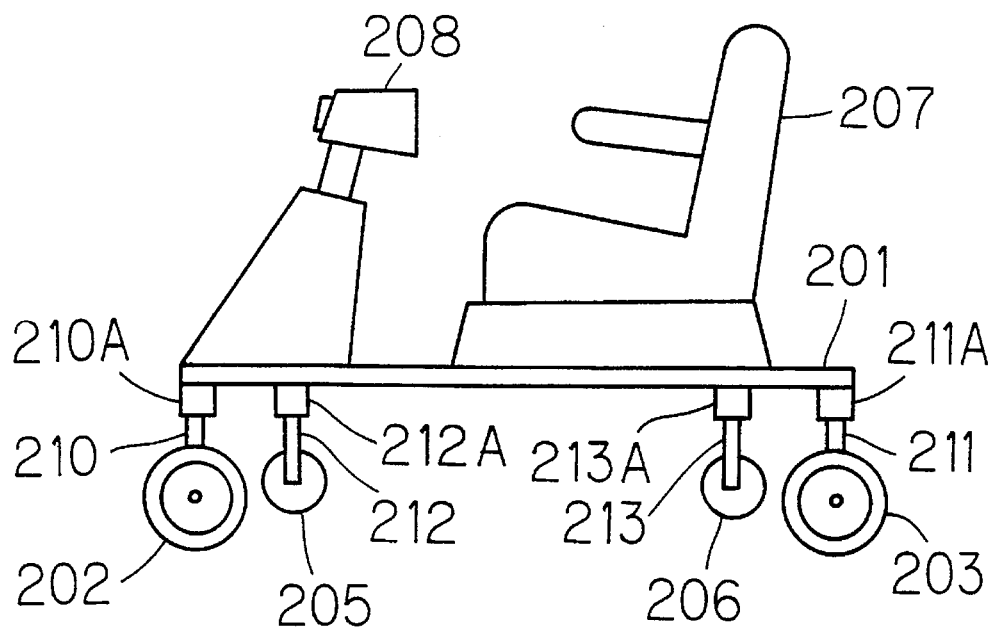
FIG. 8 is a side view of a second embodiment of a stair climbing vehicle.
Figure 9:
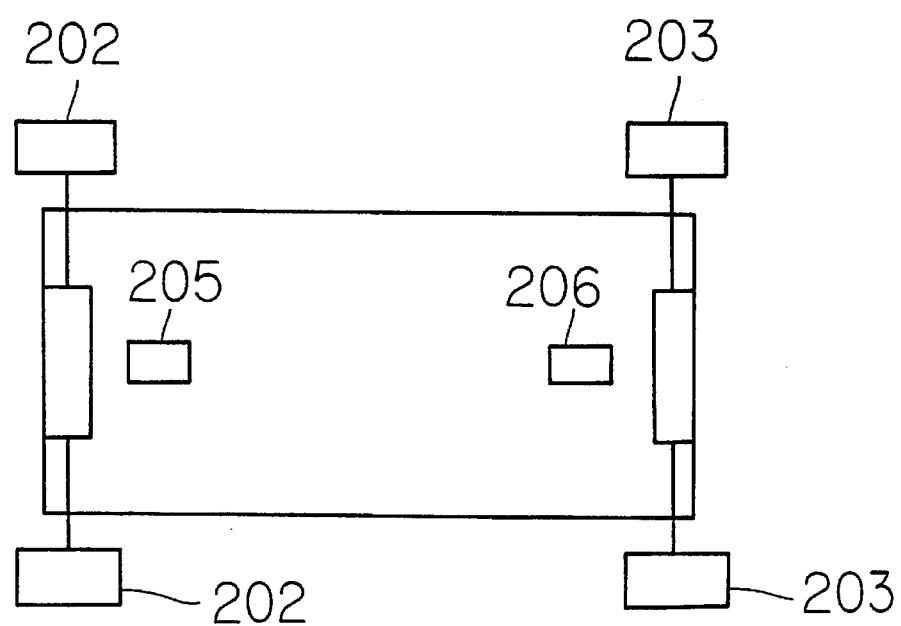
FIG. 9 is a schematic bottom view of the vehicle depicted in FIG. 8.

Referring to FIGS. 8 and 9, a second embodiment of the present invention is depicted wherein a stair climbing vehicle includes a vehicle body 201, right and left front wheels 202 provided at the front lower portions of the vehicle body 201, and right and left rear wheels 203 provided at the rear lower portions of the vehicle body 201. In addition, front and rear auxiliary wheels 205 and 206 are provided at almost central portions of the lower surface of the vehicle body 201 in the width direction. The front auxiliary wheel 205 is disposed on the rear side of the front wheels 202, and the rear auxiliary wheel 206 is disposed on the front side of the rear wheel 203. In addition, the front and rear wheels 202 and 203 can be forwardly or reversely rotated by a driving motor. The front wheels 202 are steered by a steering mechanism.

The front and rear wheels 202 and 203 are mounted to the lower ends of the front and rear legs 210 and 211 mounted to the lower surface of the vehicle body 201, respectively. Each of the front and rear legs 210 and 211 can be extended or shortened by an oil-hydraulic cylinder shown schematically as reference numerals 210A and 211A in FIG. 8. The front and rear legs 210 and 211 can be extended by a height corresponding to three steps of the stairs. The front and rear auxiliary wheels 205 and 206 are rotatably mounted to the lower ends of the legs 212 and 213, respectively. Each of the legs 212 and 213 can be extended by a height corresponding to two steps of the stairs by an actuator such as oil-hydraulic cylinders 212A and 213A. The hydraulic cylinder actuator for extending each of the legs 210 and 213 can control the extension each step and also control a height of the extension.

A seat 207 and an operation panel 208 are provided on the upper surface of the vehicle body 201. The operation panel 208 includes a main switch, a button for selecting a running mode from among a normal running mode (when the wheels go on a flat surface), an ascending mode and a descending mode, a lever for controlling a running speed, a lever for changing a steering angle of the front wheels 202, a brake switch, other keys and buttons, and a display.

Figure 10:
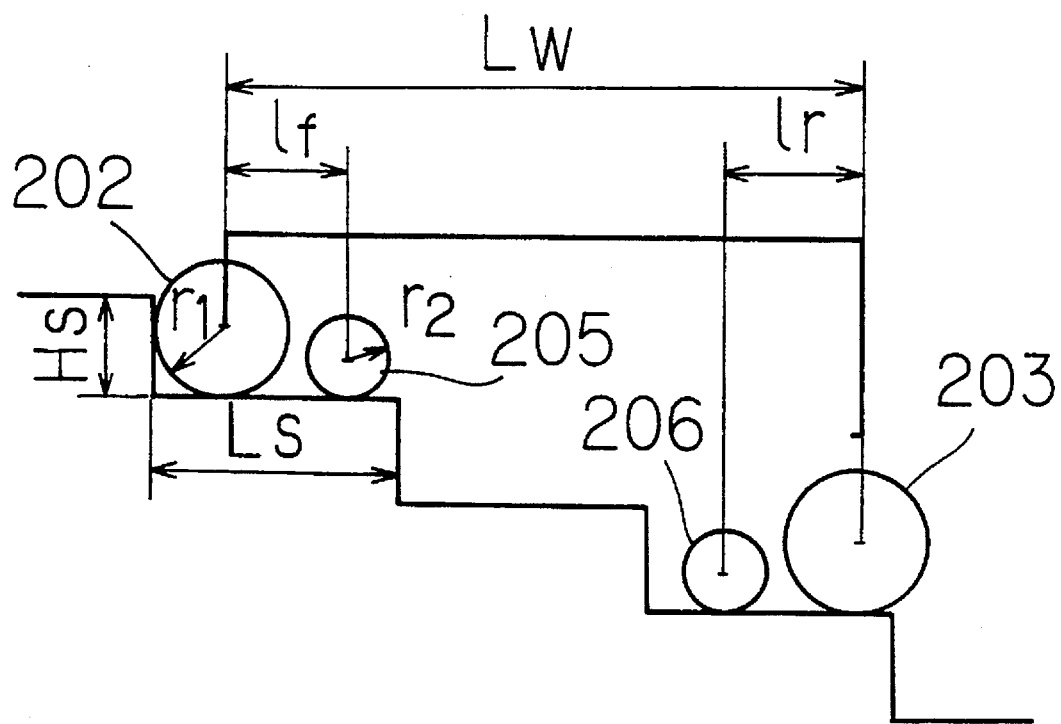
FIG. 10 is a schematic view depicting the stair dimensional relationships stairsteps, and the vehicle depicted in FIG. 8.

Referring to FIG. 10, a vehicle body dimension is as follows;

* Condition 1: The front and rear wheels 202 and 203 do not extend over four steps of stairs.

$$(r_1+Lw)<(3 \times Ls), (_{r_1}+Lw-r_1)>(2 \times Ls)$$

That is, $$2Ls<Lw<(3Ls-r_1) \quad (1)$$

* Condition 2: The front wheels 202 and the front auxiliary wheel 205 do not simultaneously go over the step.

$$r_2<1f, (r_1+1f)<Ls$$

$$r_2<1f<(Ls-r_1) \quad (2)$$

* Condition 3: The rear wheels 203 and the rear auxiliary wheel 206 do not simultaneously go over the step.

$$r_1<1r, (r_2+1r)<Ls$$

That is, $$r_1<1r<(Ls-r_2)$$

where Ls is a depth of a step of stairs, Hs is a height of the step, $r_1$ is a radius of each of the front and rear wheels 202 and 203, $r_2$ is a radius of each of the auxiliary wheels 205 and 206, Lw is a wheel base, if is an offset between the axis of rotation of the front wheel 202 and the axis of rotation of the front auxiliary wheel 205, and 1r is an offset between the rear wheel 203 and the rear auxiliary wheel 206 as shown in FIG. 10.

Figure 11:
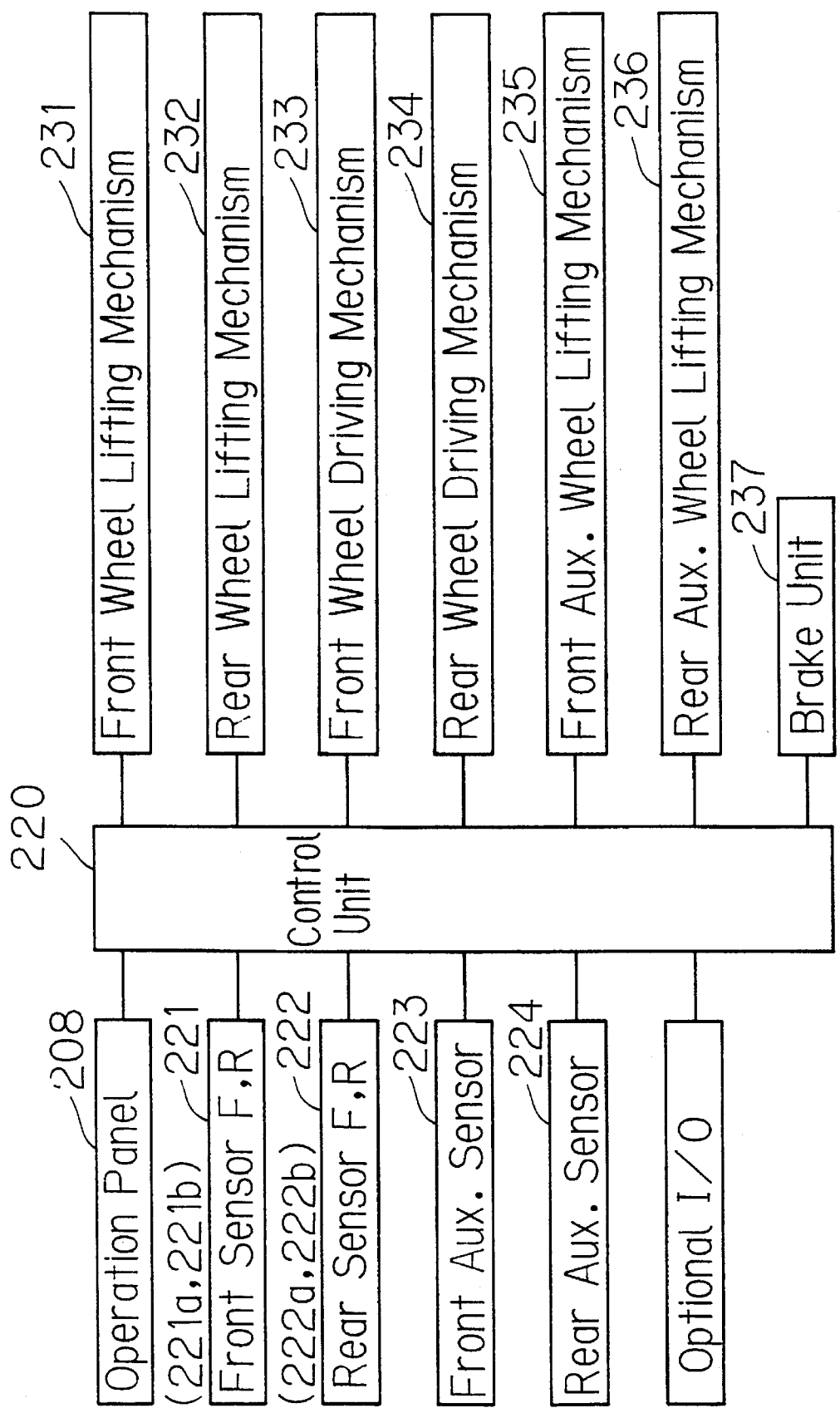
FIG. 11 is a control block diagram of the vehicle depicted in FIG. 8.

Referring to FIG. 11, a control unit 220 is provided in the vehicle. The control unit 220 includes a microcomputer consisting of a RAM, a ROM, a CPU and associated elements. To the control unit 220 connected are the operation panel 208, front sensor 221, a rear sensor 222, a front auxiliary sensor 223, a rear auxiliary sensor 224 and other I/O portions. The front and rear sensors 221 and 222 include front-side sensors 221a and 222a and rear-side sensors 221b and 222b, respectively. Each sensor detects whether or not each wheel abuts on a riser portion of stairs during the ascending operation, and detects whether or not each wheel is removed from a step surface of stairs during the descending operation. In addition, a mechanism 231 is connected to the control unit 220 for moving the front wheels 202 up and down via the hydraulic cylinder 210A, a mechanism 232 for lifting up and down the rear wheels 203 via the hydraulic cylinder 211A, a mechanism 233 for driving the front wheels 202, a mechanism 234 for driving the rear wheels 203, a mechanism 235 for lifting up and down the front auxiliary wheel 205 via the hydraulic cylinder 212A, a mechanism 236 for lifting up and down the rear auxiliary wheel 206 via cylinder 213A, and a brake unit 237.

Control of the running operation will be described according to control process flowcharts shown in FIGS. 12 and 13.

When the main switch on the operation panel 208 is pressed, an initialization procedure is carried out at step S201. In the initialization procedure, the running mode is set to the normal running mode and each of legs 210 to 213 is brought to a retracted position. Then, it is determined at step S202 whether a button specifying the normal running mode has been pressed or not. Then, it is determined at step S203 whether a stop button has been pressed or not. Then, it is determined at step S204 whether a button specifying an ascending operation has been pressed or not. Then, it is determined at step S205 whether a button specifying a descending operation has been pressed or not. In addition, it is determined at step S206 whether another key has been pressed or not.

Wherein the button for selecting the normal running mode has been pressed, the program proceeds from step S202 to step S210, in which the normal running operation is carried out. In the normal running operation, either the front wheels 202 or the rear wheels 203 are driven. Wherein the stop button has been pressed, the program proceeds from step S203 to step S211, in which the brake unit 237 is driven. Wherein the going-up button has been pressed, the program proceeds from step S204 to step S212, in which a going-up operation to be described later is carried out. Wherein the going-down button has been pressed, the program proceeds from step S205 to step S213, in which a going-down operation is carried out. Wherein optional key has been pressed, the program proceeds from step S206 to step S214, in which an operation corresponding to the pressed key is carried out. Thus, the operations corresponding to each button or manipulation of the lever are carried out until the main switch is turned off.

Figure 13:
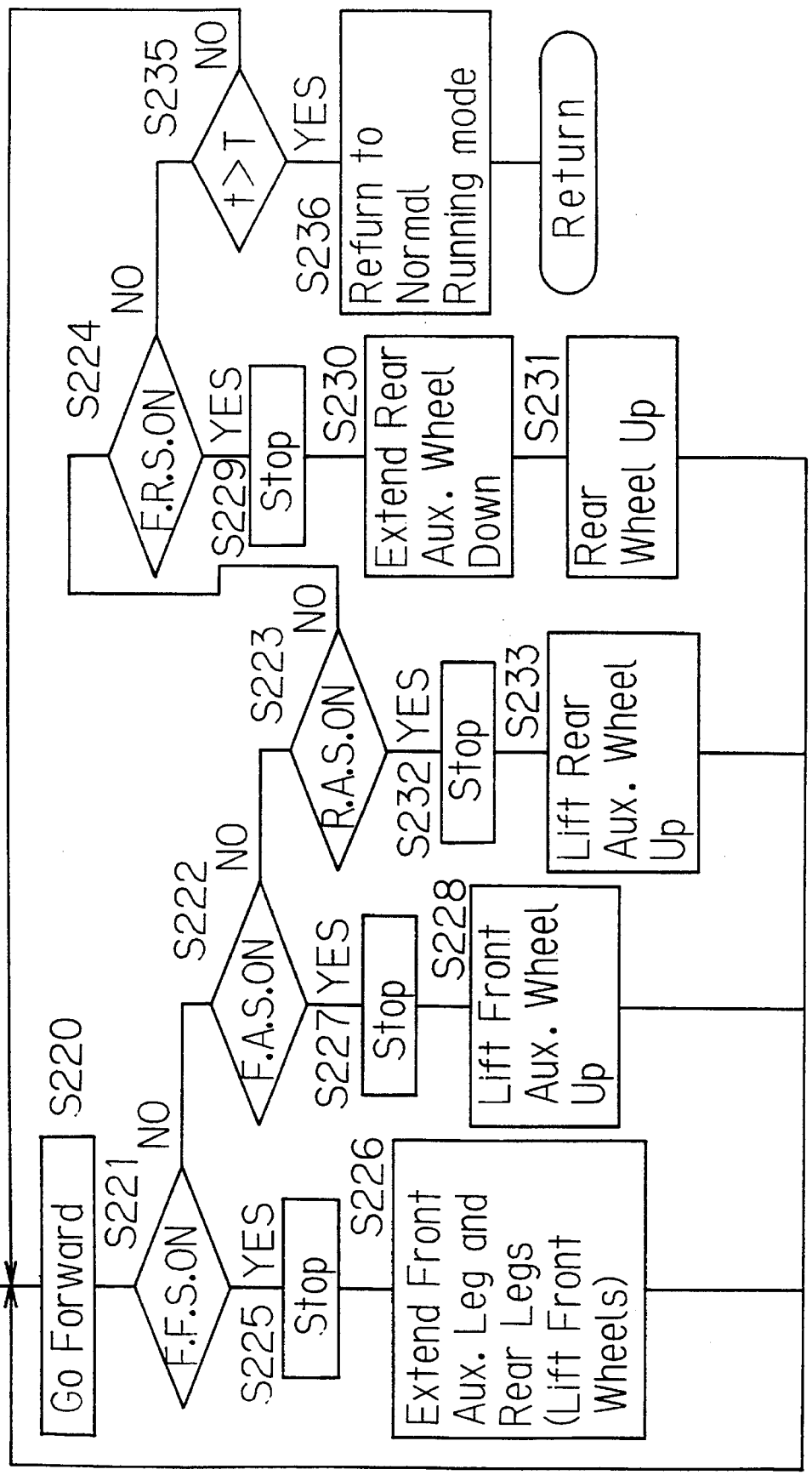
FIG. 13 is an operational flowchart of the vehicle depicted in FIG. 8, wherein the vehicle is in an ascending mode.
Figure 14A:
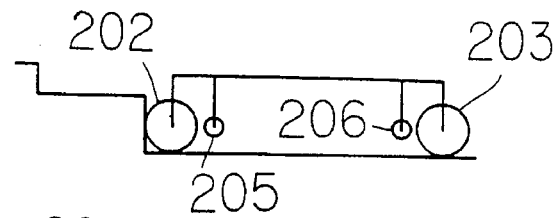
FIGS. 14(a–f) are schematic views showing stair ascending operations of the vehicle depicted in FIG. 8.
Figure 14B:
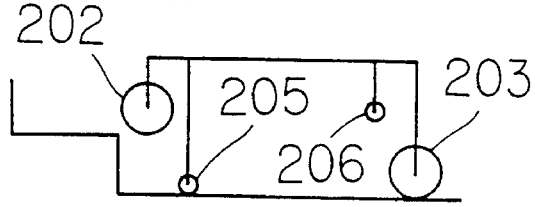

When the ascending mode has been selected, either the front wheels 202 or the rear wheels 203 are driven at step S220 in FIG. 13. It is determined at step S221 whether the front-side front sensor 221a has been turned on or not. Wherein the front-side front sensor 221a has not been turned on, that is, wherein the front wheels 202 are not in contact with the riser portion of stairs, the program proceeds to step S222. It is determined at step S222 whether the front auxiliary sensor 223 has been turned on or not. Wherein the front auxiliary wheel 205 is not in contact with the step difference portion of stairs, the determination at step S222 is NO and then, the program proceeds to step S223. It is determined at step S223 whether the rear auxiliary sensor 224 has been turned on or not. Wherein the rear auxiliary wheel 206 is not in contact with the riser portion of stairs, the determination at step S223 is NO and then, the program proceeds to step S224. It is determined at step S224 whether the front-side rear sensor 122a has been turned on or not. Wherein the rear wheels 203 are not in contact with the riser portion of stairs, the determination at step S224 is NO and then, the program proceeds to step S235. It is determined at step S235 whether elapsed time t after the wheels started to go forward, during which any sensor has not been turned on, has exceeded a predetermined time T or not. Wherein the determination at step S235 is NO, the program returns to step S220. Thus, operations at steps S221 to S224 and S235 are repeated until it is detected that any wheels of the wheels 202, 203, 205 and 206 abut on the riser portion of stairs.

Wherein the front wheels 202 abut on the first riser portion of the stairs after the wheels start to go forward (referring to FIG. 14A), the determination at step S221 becomes YES. In this case, the program proceeds from step S221 to step S225, in which the vehicle is temporarily stopped. Then, the program proceeds to step S226, in which the leg 212 of the front auxiliary wheel 205 and the legs 211 of the rear wheels 203 are extended by a height corresponding to one step of stairs. Thus, the front wheels 202 are lifted so as to go over one step of stairs. This state is shown in FIG. 14B. Then, the program returns to step S220, in which the wheels go forward again. In this case, the rear wheels 203 are driven.

Figure 14C:
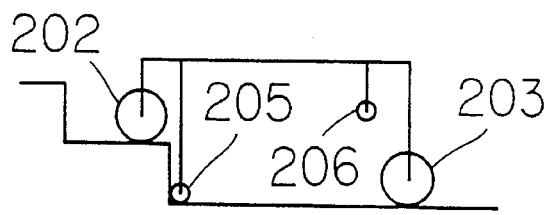

After the front wheels 202 go over the first step, the wheels go forward again. Then, the front auxiliary wheel 205 abuts the riser portion of stairs as shown in FIG. 14C, when the front auxiliary sensor 223 is turned on. Then, the program proceeds from step S222 to step S227, in which the vehicle is temporarily stopped. Then, the program proceeds to step S228, wherein the leg 212 of the front auxiliary wheel, extended at step S226, is shortened to lift the front auxiliary wheel 205. Then, the program returns to step S220, in which the vehicle starts to go forward again (FIG. 14D).

Figure 14D:
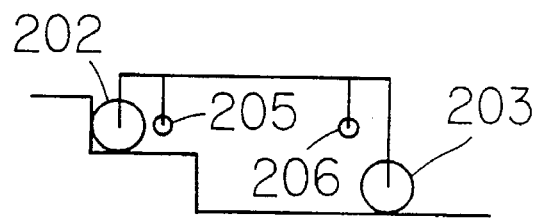
Figure 14E:
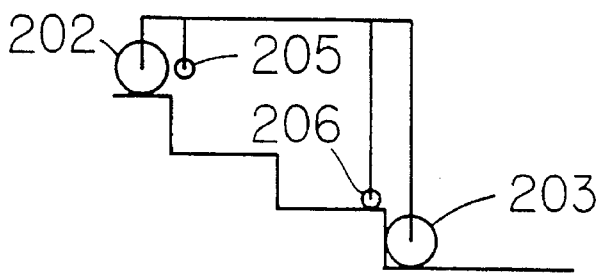
Figure 14F:
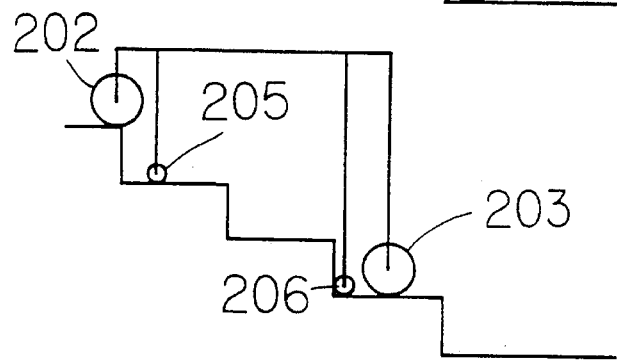

After the above-described operations are repeated, as shown in FIG. 14(e), the rear wheels 203 abut on the riser portion of stairs through a state shown in FIG. 14D and then, the front-side rear sensor 122a is turned on. In this case, the program proceeds from step S224 to step S229, in which the vehicle is temporarily stopped. Then, at step S230, the leg 213 of the rear auxiliary wheel 206 is extended, whereby the rear auxiliary wheel 206 abuts on the step surface of stairs. In this state, since the vehicle is supported by the front wheels 202 and the rear auxiliary wheel 206, the rear wheels 203 can be removed from the step surface. Then, at step S231, the rear wheels 203 are lifted by one step of stairs. After the operation at step S231, the program returns to step S220, in which the vehicle goes forward again. The vehicle goes forward until the rear auxiliary wheel 206 abuts on the riser portion of stairs as shown in FIG. 14(f). In this case, the determination at step S223 becomes YES, the program proceeds to step S232, in which the vehicle is temporarily stopped. Then, the program proceeds to step S233, in which the rear auxiliary wheel 206 is lifted to the initial position. After the operation at step S233, the program returns to step S220, in which the vehicle starts to go forward again.

The front and rear wheels 202 and 203 and auxiliary wheels 205 and 206 are thus controlled by repeating the above operations, whereby the vehicle can go up stairs.

When the vehicle finishes going up stairs, the time t during which any sensor has not been turned on, exceeds the predetermined time T. In this case, the program proceeds from step S235 to step S236, in which the running mode is reset from the ascending mode to the normal running mode. Thus, even if the front wheels 202 abut on some obstacle during running operation, any wheel is not lifted up nor down.

Figure 15:
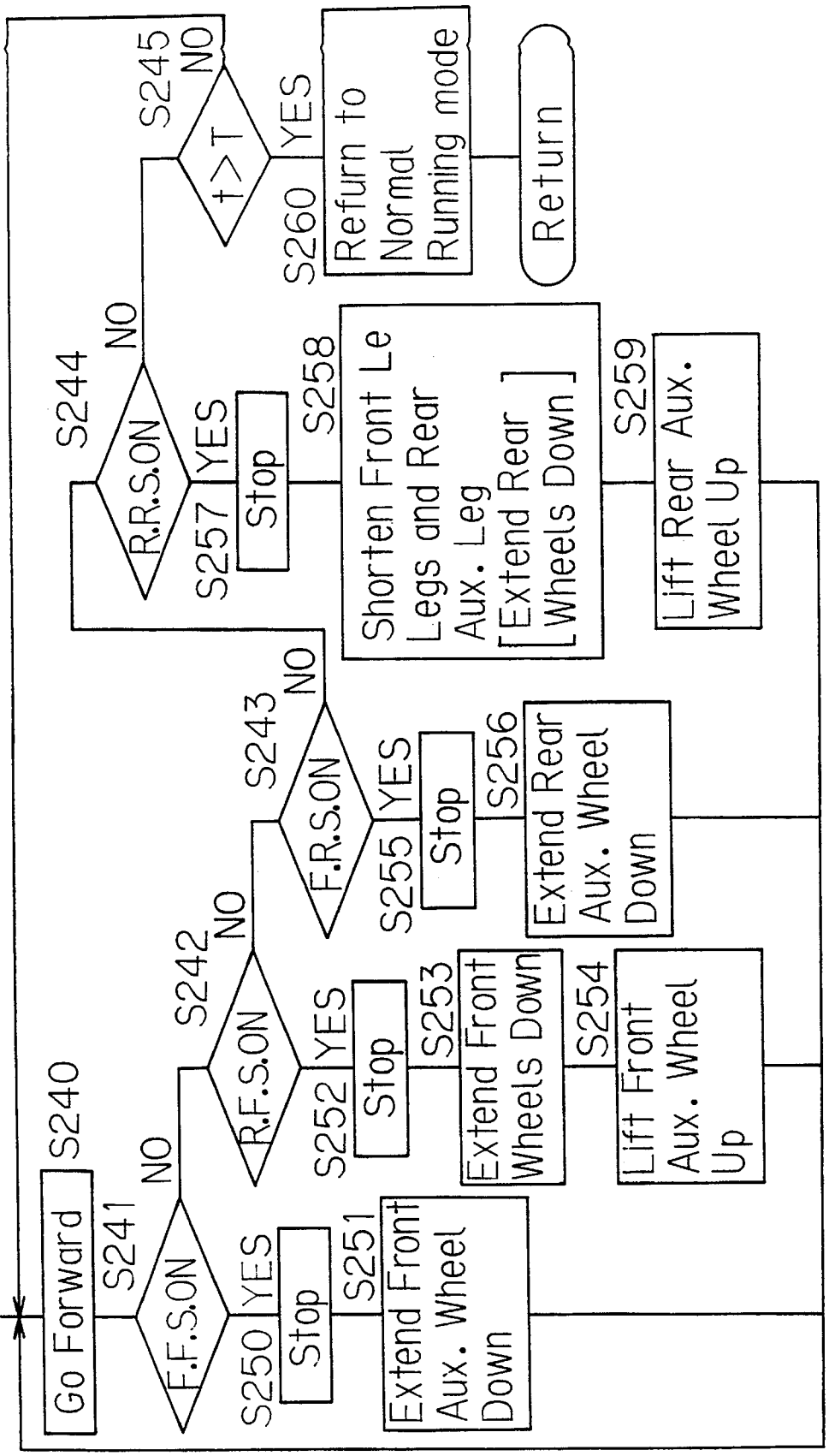
FIG. 15 is an operational flowchart of the vehicle depicted in FIG. 8, wherein the vehicle is in a descending mode.

When the descending mode has been selected, either the front wheels 202 or the rear wheels 203 are driven to go forward at step S240 shown in FIG. 15. Then, it is determined at step S241 whether the front-side front sensor 221a has been turned on or not. During the descending mode, each sensor detects whether or not the front or rear end portions of the corresponding wheels have completely come off the step surface. Wherein the determination at step S241 is NO, the program proceeds to step S242. It is determined at step S242 whether the rear-side front sensor 221b has been turned on or not. Then, it is determined at step S243 whether the front-side rear sensor 122a has been turned on or not and it is determined at step S244 whether the rear-side rear sensor 222b has been turned on or not. It is determined at step S245 whether the elapsed time t after the vehicle started to go forward, during which any sensor has not been turned on, has exceeded the predetermined time T or not. Wherein the determination at step S245 is NO, the program returns to step S240.

Figure 16A:
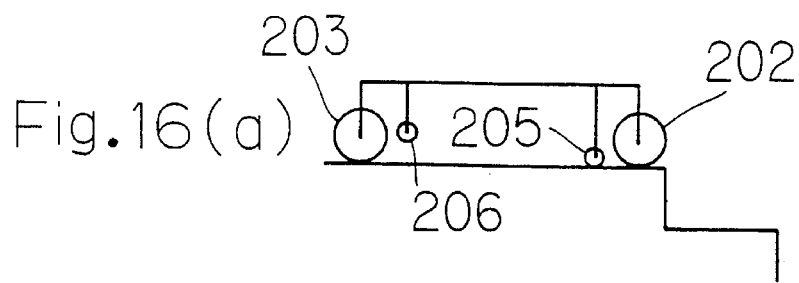
FIGS. 16(a–e) are schematic views showing stair descending operations of the vehicle depicted in FIG. 8.
Figure 16B:
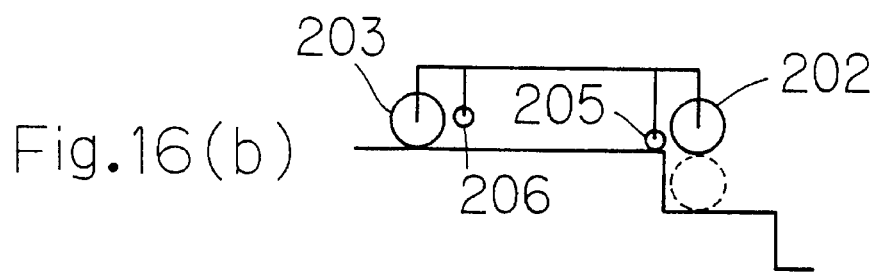

Referring to FIG. 16A, when the front ends of the front wheels 202 reach the riser portion of stairs, the front-side front sensor 221a is turned on. Then, the program proceeds from step S241 to step S250, in which the vehicle is temporarily stopped. Then, the program proceeds to step S251, in which the front auxiliary wheel 205 is lifted down to abut on the running surface. In this state, even if the front wheels 202 are apart from the running surface (referring to FIG. 16A), the vehicle body 201 can be maintained in a stable state. After the operation at step S251, the program returns to step S240, in which the vehicle goes forward. As shown in FIG. 16B, when the front wheels 202 are completely apart from the step surface of stairs and come to a position where they can be extended down, the rear-side front sensor 221b is turned on. In this case, the program proceeds from step S242 to step S252. At step S252, the vehicle is temporarily stopped. Then, the program proceeds to step S253, in which the front wheels 202 are extended down to abut on the step surface of stairs. After the front wheels 202 abut on the step surface of stairs, the program proceeds to step S254, in which a command for lifting up the front auxiliary wheel 205 is made. Thereafter, the program returns to step S240.

Figure 16C:
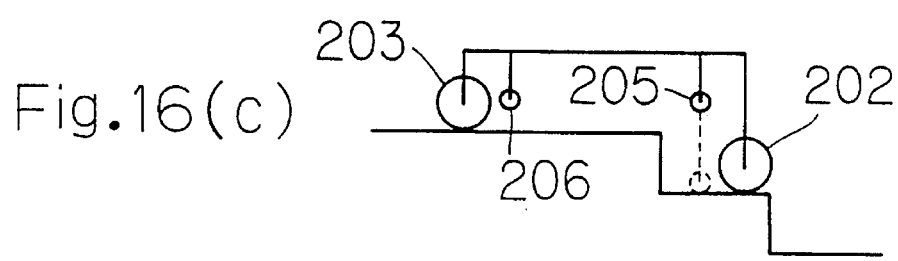
Figure 16D:
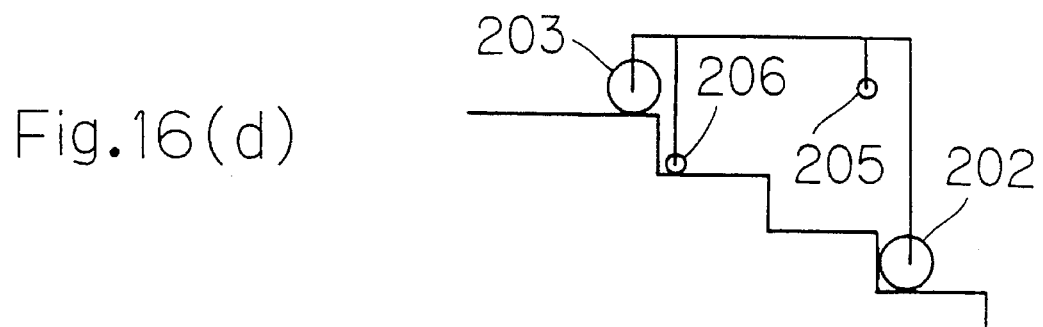
Figure 16E:
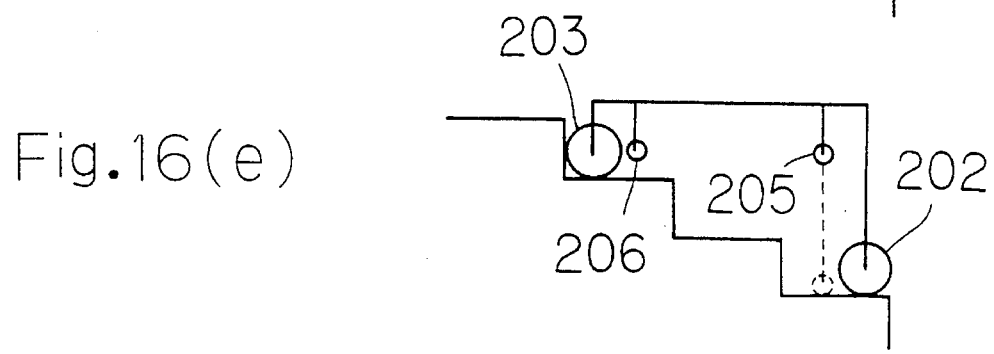

The vehicle goes forward by repeating the above-described operations. As shown in FIG. 16D, when the rear wheels 203 reach the step surface after the state shown in FIG. 16C, the front-side rear sensor 222a is turned on. Then, the program proceeds from step S243 to step S255. At step S255, the vehicle is temporarily stopped. Then, at step S256, the rear auxiliary wheel 206 is extended down to abut on the step surface of stairs. In this state, if the rear wheels 203 are separated from the running surface, the vehicle body 201 can be maintained in a stable state. After the operation at step S256, the program returns to step S240.

The rear wheels 203 go forward further from the state shown in FIG. 16D and when they come to a position to be extended down to the lower step surface, the rear-side rear sensor 222b is turned on. In this case, the program proceeds from step S244 to step S257. At step S257, the vehicle is temporarily stopped. Then, the program proceeds to step S258, in which the front legs 210 and the leg 213 of the rear auxiliary wheel 206 are shortened by a height corresponding to one step of stairs, whereby the rear wheels 203 are lowered by one step of stairs. Then, the program proceeds to step S259, in which a command for returning the rear auxiliary wheel 206 to the initial position is made and then, the program returns to step S240.

By repeating the above-described operations, the vehicle can go down stairs step by step. When the vehicle goes on the flat surface after the stairs, the elapsed time t after the vehicle started to go forward, during which any sensor has not been turned on, exceeds the predetermined time T. In this case, the program proceeds to step S245 to step S260. At step S260, the normal running mode is implemented.

Although the front and rear wheels 202 and 203 are driven in the above embodiment of the present invention, the auxiliary wheels and the rear wheels may be powered.

Although the steering mechanism is provided only at the front wheels 202 according to the above embodiment of the present invention, the steering mechanism may be provided at the rear wheels 203. Alternatively, driving force may be applied to each of the front and rear wheels, whereby the steering mechanism can be implemented.

When the vehicle goes down stairs, it may be powered by the rear wheels.

The controlling operation during the ascending and descending stairs described above is one example, and it should be understood that variations and modifications to the above are possible and are intended to be within the scope of the invention.

Further, it should be understood that the number of each of the front and rear wheels are not limited to two. The number of the front wheel 202 or the rear wheel 203 may be, for example one. For instance, the described embodiment includes the front and rear wheels 202 and 203 which define a two axle structure. A three-axle configuration may be used.

Although the wheel base of the vehicle corresponds to a width of three steps in the above embodiment of the present invention, if the wheel base corresponds to a width of two steps, the auxiliary wheel 205 is extensible up or down by a height of one step and the rear wheels 203 are extensible up or down by a height of two steps.

Figure 17:
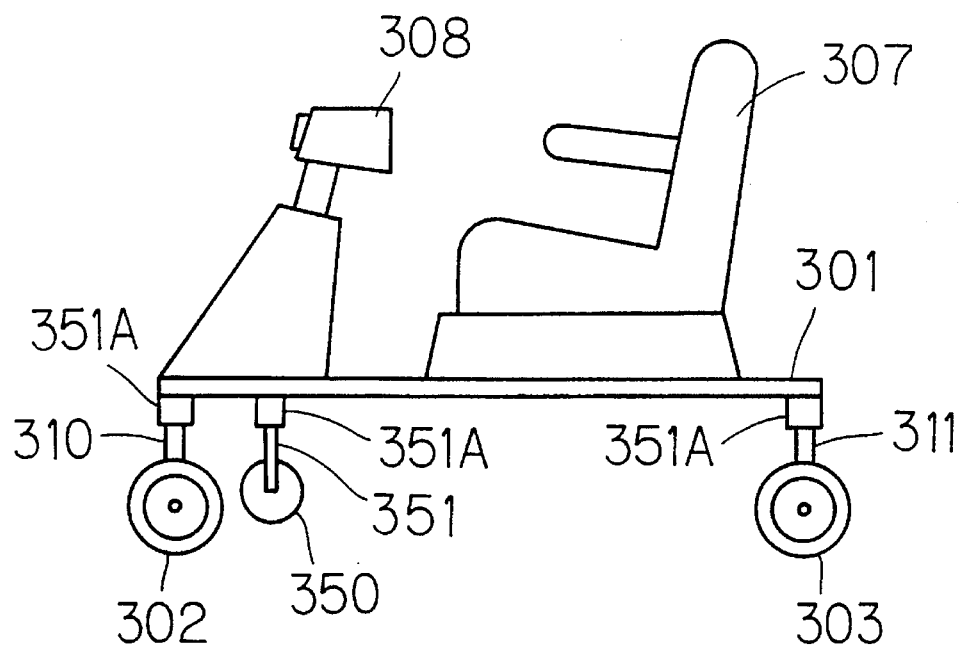
FIG. 17 is a side view of a third embodiment of a stair climbing vehicle of the present invention.
Figure 18:
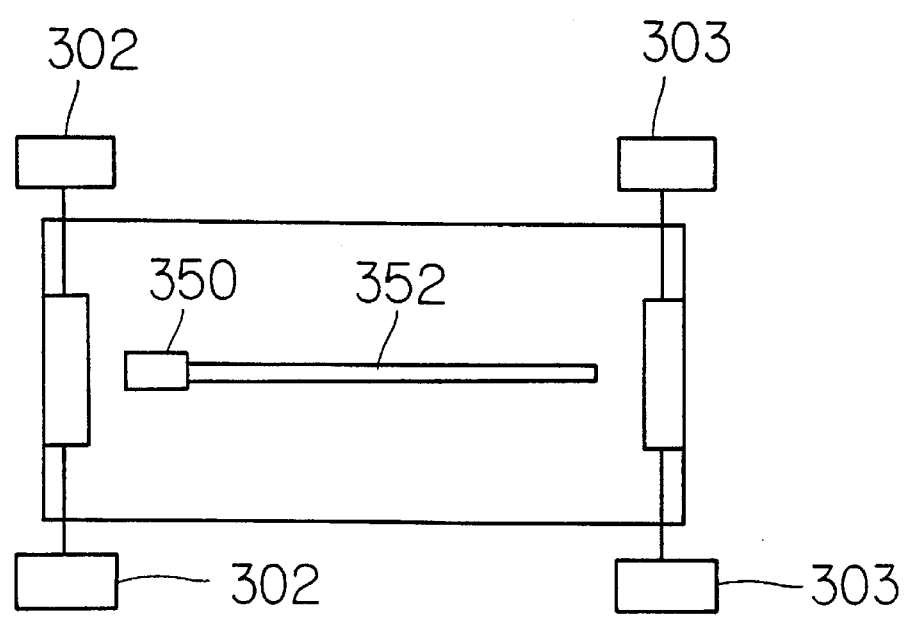
FIG. 18 is a schematic bottom view of the vehicle depicted in FIG. 17.

Referring to FIGS. 17 and 18, similar to the first embodiment of the present invention, a third embodiment of the present invention is depicted wherein a vehicle for going up and down stairs includes a vehicle body 301, front and rear wheels 302 and 303, front and rear legs 310 and 311, a seat 7 and an operation panel 308. The vehicle also includes an auxiliary wheel 350 that is positioned under the vehicle body 301, and is movable along a central lengthwise portion of the vehicle.

The auxiliary wheel 350 is mounted to the lower end of the leg 351. The leg 351 is movable from the front to the rear along a guide groove 352 formed in the vehicle body 301 by, for instance, an electric motor (not shown). Each of the legs 310, 311 and 351 can be extended or shortened by an actuator such as an oil hydraulic cylinder 351A. The front and rear legs 310 and 311 are configured to be extended by at least a height of three steps of stairs. The leg 351 of the auxiliary wheel 350 can be extended by a height of two steps of stairs.

Figure 19:
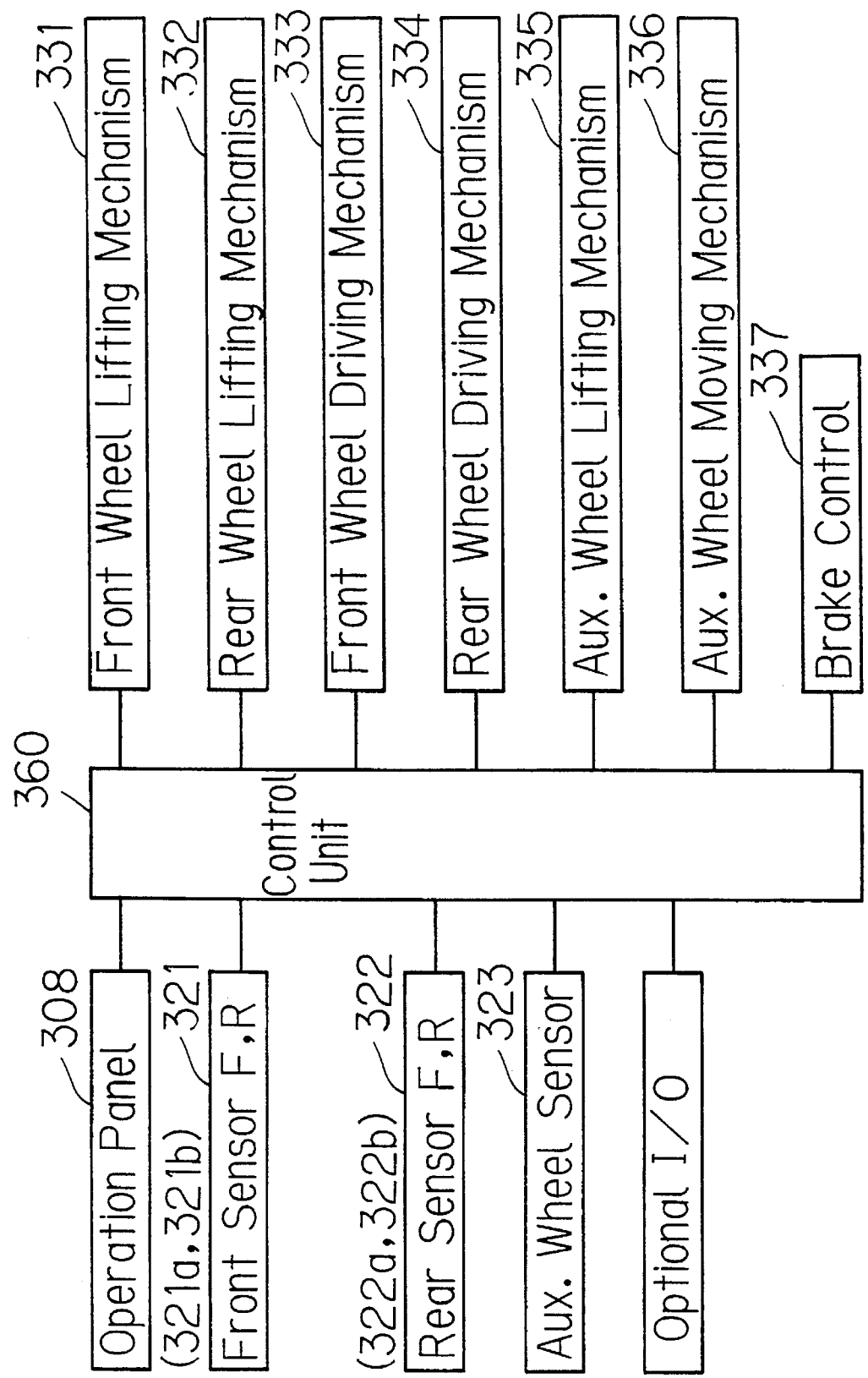
FIG. 19 is a control block diagram of the vehicle depicted in FIG. 17.
Figure 20:
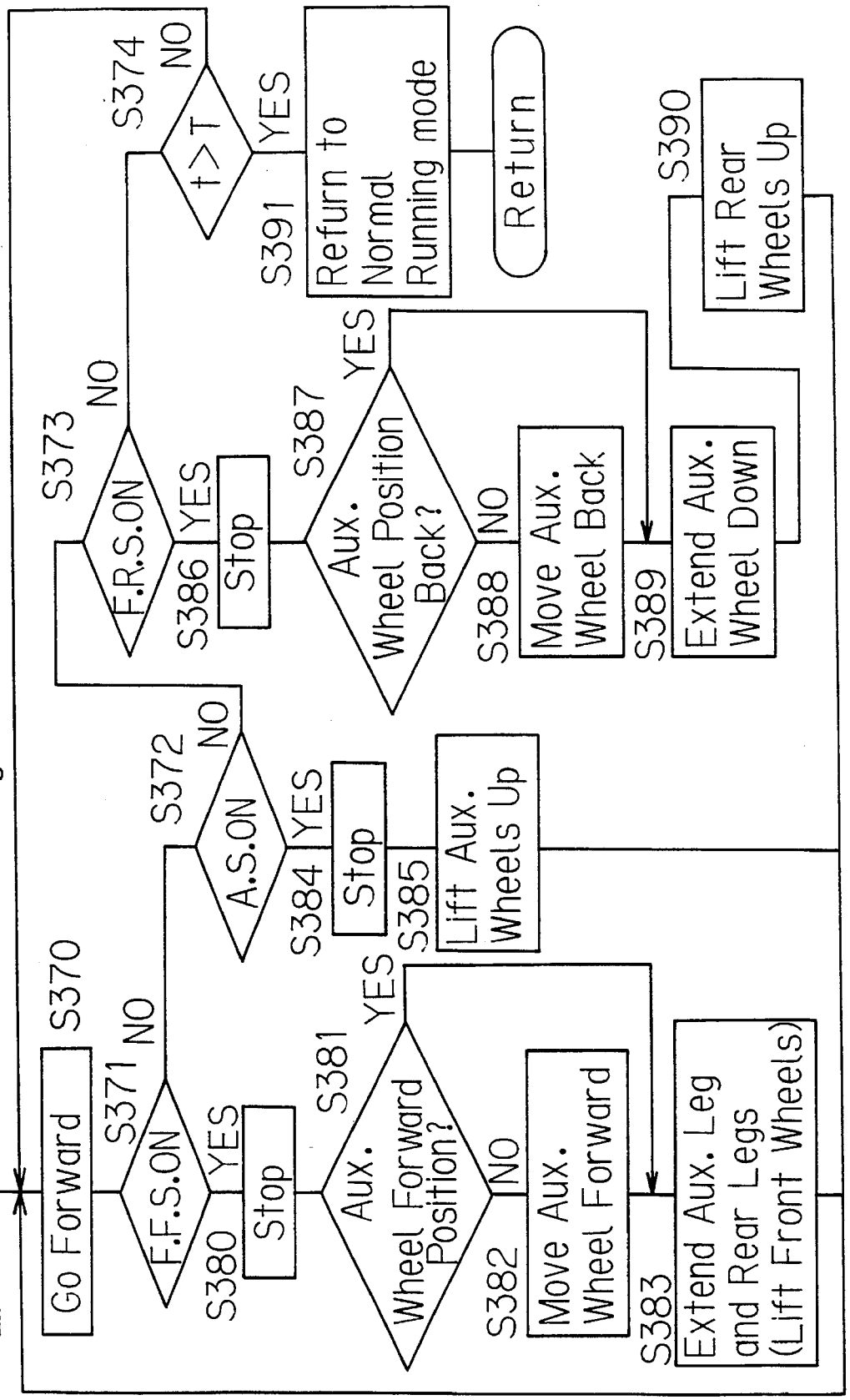
FIG. 20 is an operational flowchart of the vehicle depicted in FIG. 17, wherein the vehicle is in an ascending mode.

In addition, the vehicle includes a control unit 360 as shown in FIG. 19. Similar to the first embodiment of the present invention, the control unit 360 includes a microcomputer comprising a RAM, a ROM, a CPU and associated elements. To the control unit 360 connected are the operation panel 308, sensors 321, 322, 323 and 324, a front wheel lifting mechanism 331, a rear wheel lifting mechanism 332, a front wheel driving mechanism 333, and a rear wheel driving mechanism 334. Additionally, to the control unit 360 connected are a mechanism 355 for lifting up and down the auxiliary wheel 350, a mechanism 356 for moving the auxiliary wheel 350 in the front-to-rear direction, and a brake unit 337. Similar to the first embodiment of the present invention, the front sensor 321 includes a front-side front sensor 321a and a rear-side front sensor 321b, and the rear sensor 323 includes a front-side rear sensor 322a and a rear-side rear sensor 322b.

Figure 12:
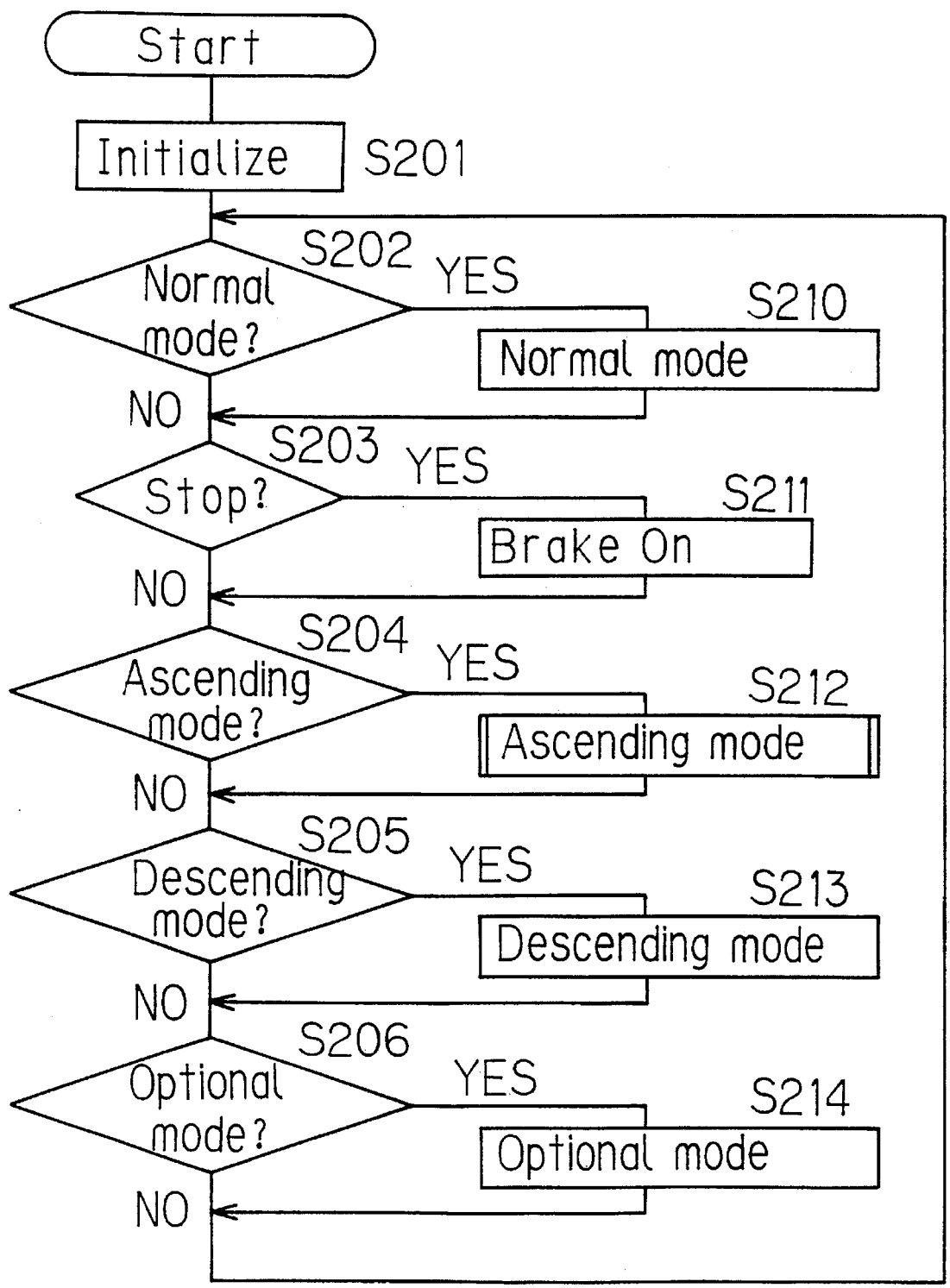
FIG. 12 is a operational flowchart of the vehicle depicted in FIG. 8.

Main control such as selection of lifting up/down mode is carried out according to the same control process as the control flowchart shown in FIG. 12 according to the second embodiment of the present invention.

Wherein ascending mode is selected the program proceeds to step S370, in which a vehicle goes forward. Then, it is determined at step S371 whether the front-side front sensor 321a has been turned on or not. Wherein the determination at step S371 is NO, the program proceeds to step S372. It is determined at step S372 whether the auxiliary sensor 323 has been turned on or not. It is determined at step S373 whether the rear-side front sensor 321b has been turned on or not. It is determined at step S374 whether the elapsed time t after the vehicle started to go forward at step S370, during which any sensor has not been turned on, has exceeded the predetermined time T or not.

Figure 21A:
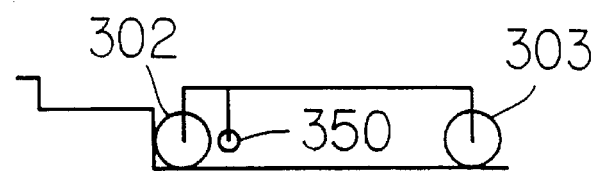
FIGS. 21(a–e) are schematic views of the vehicle depicted in FIG. 17 in an ascending mode.
Figure 21B:
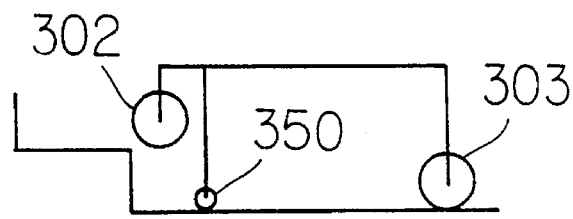

When the front wheels 302 reach the riser portion of stairs, the front-side front sensor 321a is turned on and then, the program proceeds from step S371 to step S380. At step S380, the vehicle is temporarily stopped. Then, it is determined at step S381 whether the auxiliary wheel 350 is positioned forward. Wherein the auxiliary wheel 350 is not positioned forward, the program proceeds from step S381 to step S382. At step S382, the auxiliary wheel 350 is moved to the rear side of the front wheels 302 (referring to FIG. 21A). Wherein the determination at step S381 is YES, the program skips step S382 and proceeds to step S383. At step S383, the leg 350 of the auxiliary wheel 350 and the legs 311 of the rear wheels 303 are extended by a height corresponding to one step of stairs. Then, the front wheels 302 are lifted up, as is shown in FIG. 21B. After step S383, the program returns to step S370.

Figure 21C:
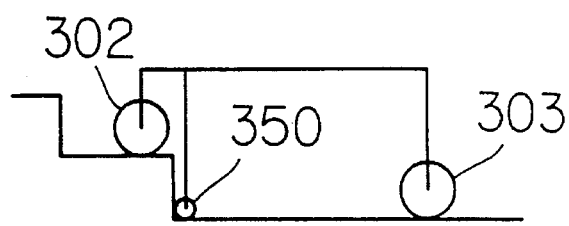
Figure 21D:
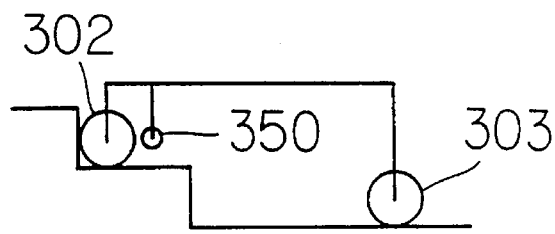

As shown in FIG. 21C, when the auxiliary wheel 350 abuts on the step difference portion of stairs, the determination at step S372 becomes YES, the program proceeds from step S372 to step S384. At step S384, the vehicle is temporarily stopped. Then, the program proceeds to step S385, in which the auxiliary wheel 350 is lifted to the initial position and then, the program returns to step S370.

Figure 21E:
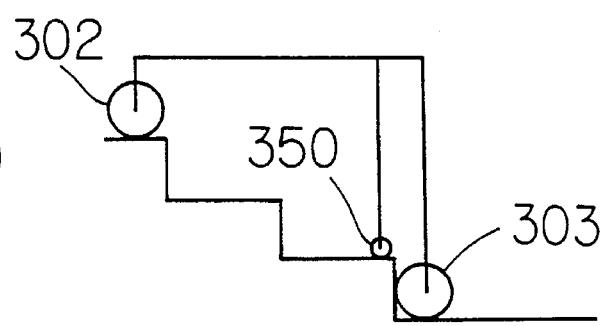

By repeating the above operations, the front wheels 302 go up stairs. Then, when the rear wheels 303 abuts on the riser portion of stairs, the front-side rear sensor 322a is turned on. Then, the program proceeds from step S373 to step S386. At step S386, the vehicle is temporarily stopped and then, the program proceeds to step S387. It is determined at step S387 whether the auxiliary wheel 350 is positioned backward or not. Wherein it is not, the program proceeds to step S388, in which the auxiliary wheel 350 is moved backward. Meanwhile, wherein the auxiliary wheel 350 is positioned in the rear, the program skips step S388 and proceeds from step S387 to step S389. At step S389, the auxiliary wheel 350 is lifted down to abut on the step surface of stairs. This state is shown in FIG. 21E. In this state, since the auxiliary wheel 350 abuts on the step surface of stairs, even if the rear wheels 303 are apart from the step surface of stairs, the vehicle body 301 can be maintained in the stable state. Wherein it is determined at step S389 that the auxiliary wheel 350 abuts on the step surface, the program proceeds to step S390. At step S390, the rear wheels 303 are lifted up by one step of stairs. Then, the program proceeds to step S370, in which the vehicle goes forward again.

By repeating the above operation, the vehicle can go up stairs. When the vehicle goes on the flat surface after the stairs, the time t during which any sensor has not been turned on, exceeds the predetermined time T. In this case, the program proceeds from step S374 to step S391. At step S391, the going-up mode is finished and the normal running mode is started. Therefore, while the vehicle goes forward on the flat surface at the normal running mode, even if the front wheels 302 abut on an obstacle or the like, any wheel is not lifted up nor down.

Wherein the descending mode is selected, the wheels start to go forward at step S400 shown in FIG. 22. Then, it is determined at step S401 whether the front-side front sensor 321a has been turned on or not. It is determined at step S402 whether the rear-side front sensor 321b has been turned on or not. It is determined at step S403 whether the front-side rear sensor 322a has been turned on or not. It is determined at step S404 whether the rear-side rear sensor 322b has been turned on or not. It is determined at step S405 whether the elapsed time t after the vehicle started, during which any sensor has not been turned on, has exceeded the predetermined time T or not.

Figure 23A:
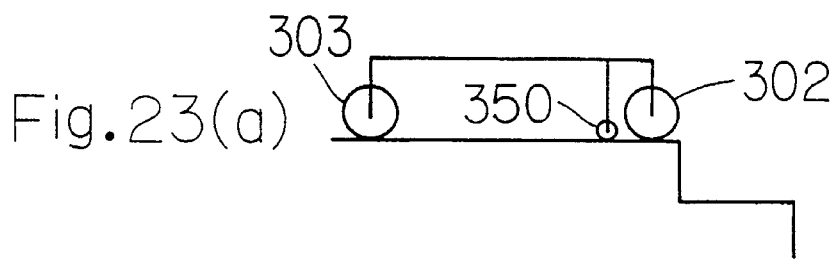
FIGS. 23(a–e) are schematic views of the vehicle depicted in FIG. 17, showing the vehicle in a descending mode.

As shown in FIG. 23A, when the front ends of the front wheels 302 come off the riser portion, the front-side front sensor 221a is turned on. In this case, the program proceeds from step S401 to step S410, in which the vehicle is temporarily stopped. It is determined at step S411 whether the auxiliary wheel 350 is positioned forward or not. Wherein it is not, the program proceeds to step S412, in which the auxiliary wheel 350 is moved forward. Meanwhile, wherein the auxiliary wheel 350 is placed in the forward position, the program skips S412 and proceeds from step S411 to step S413. At step S413, the auxiliary wheel 350 is lifted down to abut on the step surface. Then, the program returns to step S400.

Figure 23B:
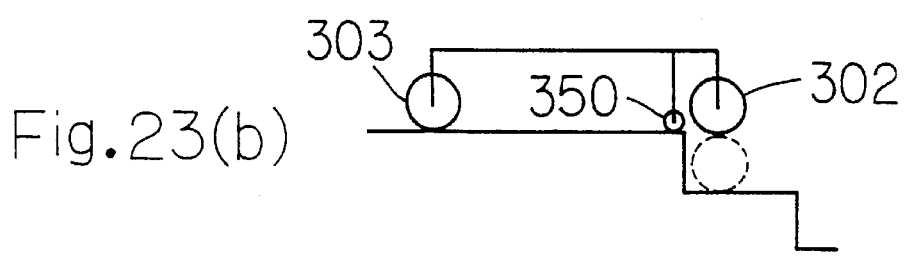
Figure 23C:
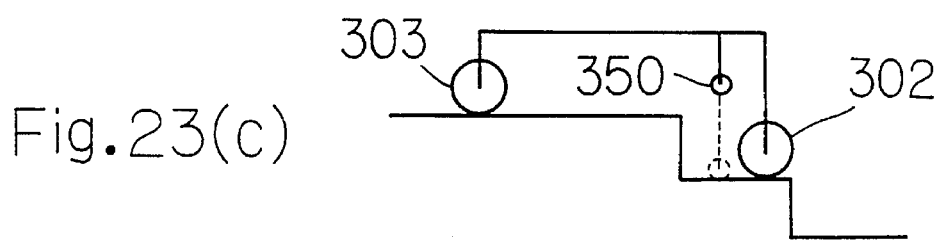

As shown in FIG. 23B, when the rear ends of the front wheels 302 pass the edge of the step adjacent to the riser portion of the stairstep and reach a position where the front wheels hang free, the rear-side front sensor 221b is turned on. In this case, the program proceeds from step S402 to step S414. At step S414, the vehicle is temporarily stopped. Then, the program proceeds to step S415, in which the front wheels 302 are lifted down to abut on the step surface of stairs. Then, at step S416, a command issues for extending the auxiliary wheel 350 down to the initial position is output and then, the program returns to step S400.

Figure 23D:
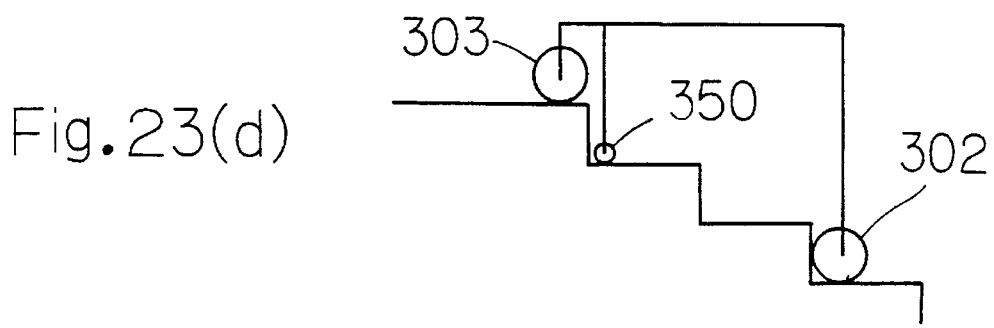

By repeating the above operations, the front wheels 302 go down stairs. When the front ends of the rear wheels 303 come off the step surface of stairs, the front-side rear sensor 322a is turned on. In this case, the program proceeds from step S403 to step S420. At step S420, the vehicle is temporarily stopped. Then, the program proceeds to step S421, in which it is determined whether the auxiliary wheel 350 is positioned properly or not. Wherein it is not, the program proceeds to step S422, in which the auxiliary wheel 350 is moved. Meanwhile, wherein the wheel 350 is properly positioned already, the program proceeds from step S421 to step S423. At step S423, the auxiliary wheel 350 is extended down to abut on the step surface of stairs. This state is shown in FIG. 23D.

Figure 23E:
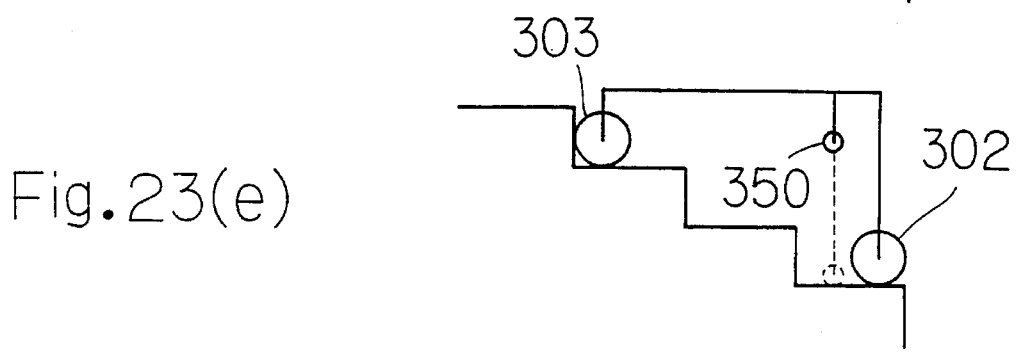

When the rear ends of the rear wheels 303 come off the step surface of stairs and come to a position where the rear wheels 303 hang free, the rear-side rear sensor 322b turns on. In this case, the program proceeds from step S404 to step S425. At step S425, the vehicle is temporarily stopped. Then, the program proceeds to step S426, in which the front legs 310 and the leg 351 of the auxiliary wheel 350 are shorted by one step of stairs, whereby the rear wheels 303 are lowered down by one step. Then, the program proceeds to step S427, in which the auxiliary wheel 350 is moved to the initial position. This state is shown in FIG. 23(e). After a command for lifting up the auxiliary wheel 350 is outputted, the program returns to step S400, in which the vehicle goes forward.

Thus, the vehicle goes down stairs. When the vehicle reaches the flat surface after the stairs, the elapsed time t after the vehicle started, during which any sensor has not been turned on, exceeds the predetermined time T. In this case, it is determined that the vehicle has moved to the flat surface and then, the program proceeds from step S405 to step S430. At step S430, the running mode proceeds to the normal running mode.

According to both embodiments of the present invention, the vehicle body can always be maintained in a horizontal state by lifting up and down each wheel when the vehicle goes up and down stairs. In addition, since power in the running direction is not applied to each wheel when each wheel goes over the step difference of stairs, a load is not applied to a corner portion of the step so that the corner portion is prevented from being damaged.

Although the front and rear wheels 302 and 303 are powered in the above embodiment of the present invention, the auxiliary wheel and the rear wheel may be powered.

Although the steering mechanism is provided only at the front wheels 302 in the above embodiment of the present invention, the steering mechanism may be provided at the rear wheels 303. Alternatively, driving force may be applied to each of the front and rear wheels, whereby the steering mechanism can be implemented.

When the vehicle goes down stairs, it may go down from the rear wheels.

The controlling operation such as the ascending and descending modes described herein are examples only, and other controlling operations may be used.

The number of front and rear wheels are not limited to the four wheels disclosed herein. For instance, a vehicle having three wheels is also within the scope of the present invention.

Although two kinds of wheels, that is, the front and rear wheels 302 and 303 are provided so as to be two-axis structure in the above embodiment of the present invention, three-axis structure may be used.

Although the wheel base of the vehicle corresponds to a width of three steps in the above embodiment of the present invention, if the wheel base corresponds to a width of two steps, the auxiliary wheel 350 is lifted up or down by a height of one step and the rear wheels 303 are lifted up or down by a height of two steps.

Figure 24:
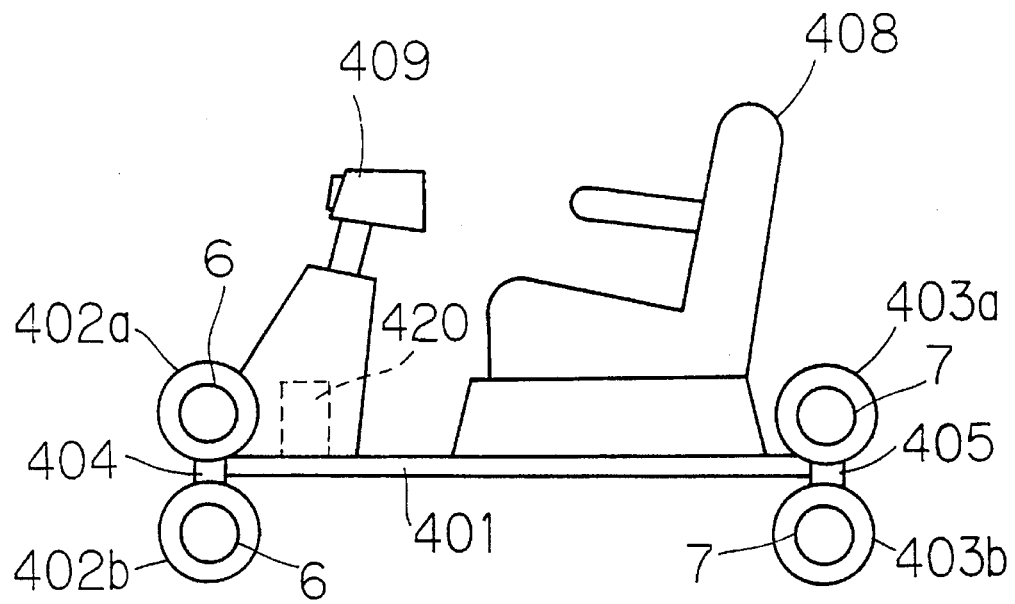
FIG. 24 is a side view of a fourth embodiment of the present invention.
Figure 25:
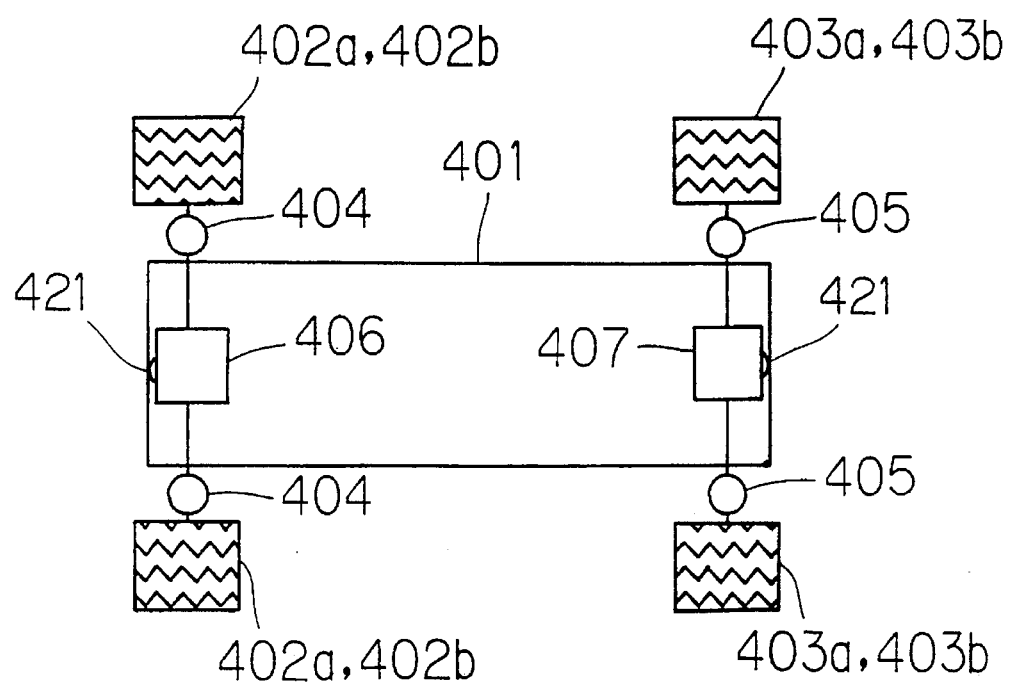
FIG. 25 is a schematic bottom view of the vehicle depicted in FIG. 24.
Figure 31:
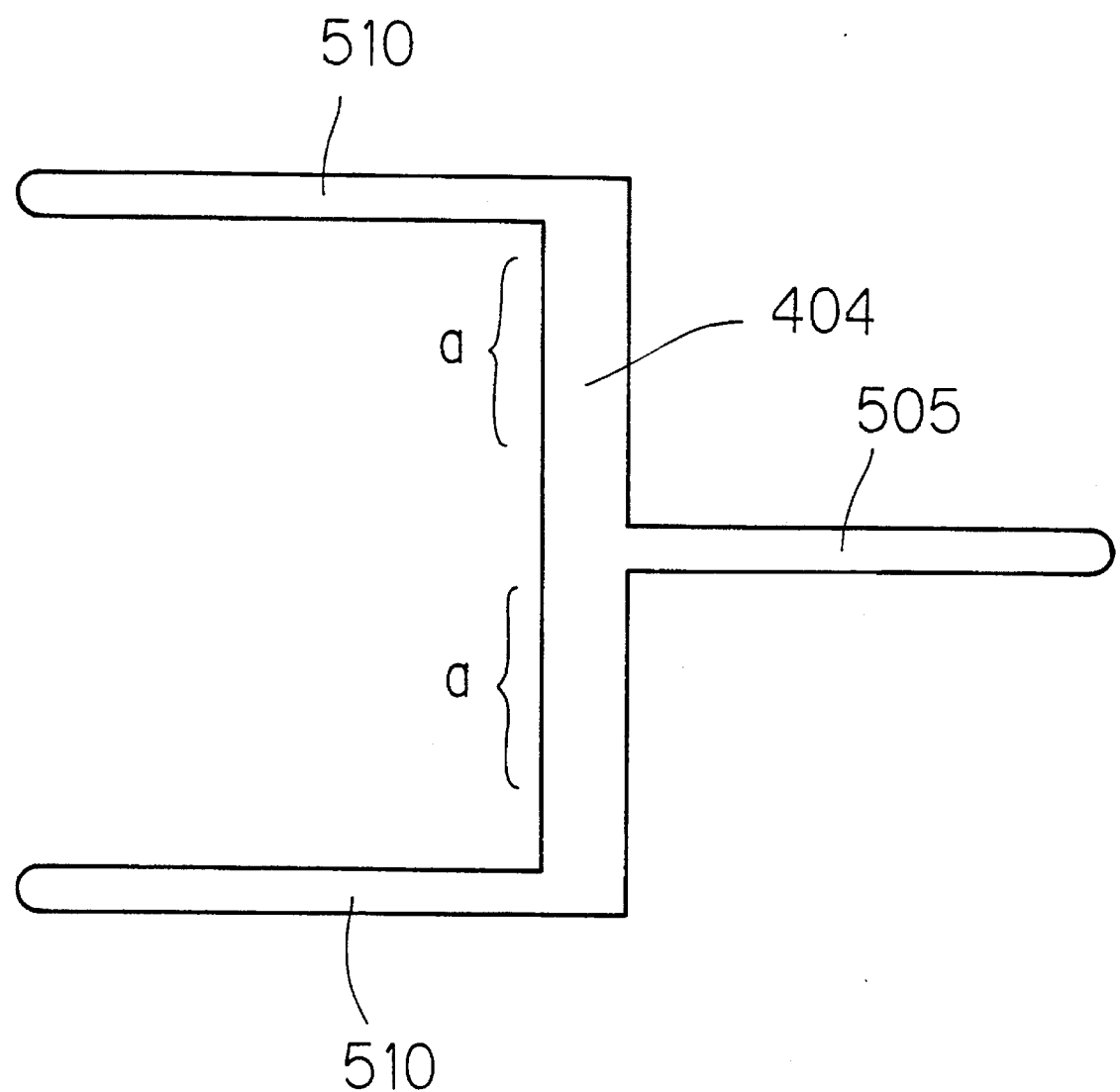
FIG. 31 is an elevation of an axle shown removed from the vehicle depicted in FIG. 24.

Referring to FIGS. 24 and 25, a fourth embodiment of the present invention is depicted. In this embodiment, a vehicle for going up and down stairs includes a vehicle body 401, two pairs of front wheels 402a and 402b on the right and left sides, two pairs of rear wheels 403a and 403b on the right and left sides. The front wheels 402a and 402b and the rear wheels 403a and 403b are rotatably mounted to both ends of front and rear arms 404 and 405, respectively. The front arm 404 is vertically provided on each side in the front of the vehicle body 401. The front arm 404 is rotatable around its central shaft 505 by 180° (see FIG. 31). Similarly, the rear arm 405 is vertically provided on each side in the rear of the vehicle body 401. The rear arm 405 is rotatable around its central shaft by 180°. One arm 404 is depicted in FIG. 31 and is also representative of the rear arm 405. The arm 404 includes the shaft 505 which is rotatably supported by the body 401. The arm 404 has axles 510 which are spaced apart from the shaft 505 and extend in a direction opposite the shaft 505. The wheels 402a and 402b are rotatably mounted on the axles 510 on the arm 404 and the wheels 403a and 403b are likewise rotatably mounted on the shafts 510 on the arm 405. In addition, wheels 402a, 402b, 403a, and 403b are forwardly or reversely rotated about the shaft 505 by driving motors 406 and 407 provided under the vehicle body 401. A steering mechanism (not shown) is provided under the vehicle body 401 and the front wheels 402a and 402b can be steered by the steering mechanism.

In addition, the distance between the pair of front wheels 402a and 402b and a distance between the pair of rear wheels 403a and 403b are set so that the lowermost portions of the upper positioned wheels (i.e. wheels 402a and 403g in FIG. 24) are at or above the upper step surface when the lower wheels (wheels 402b and 403b) abut on the step surface.

A seat 408 and an operation panel 409 are provided on the upper surface of the vehicle body 401. The operation panel 409 includes a lever for a steering operation, a main switch, a button for selecting a running mode from among a normal running mode, an ascending mode and a descending mode, a lever for controlling a running speed, a brake switch, a display and other switches.

Figure 26:
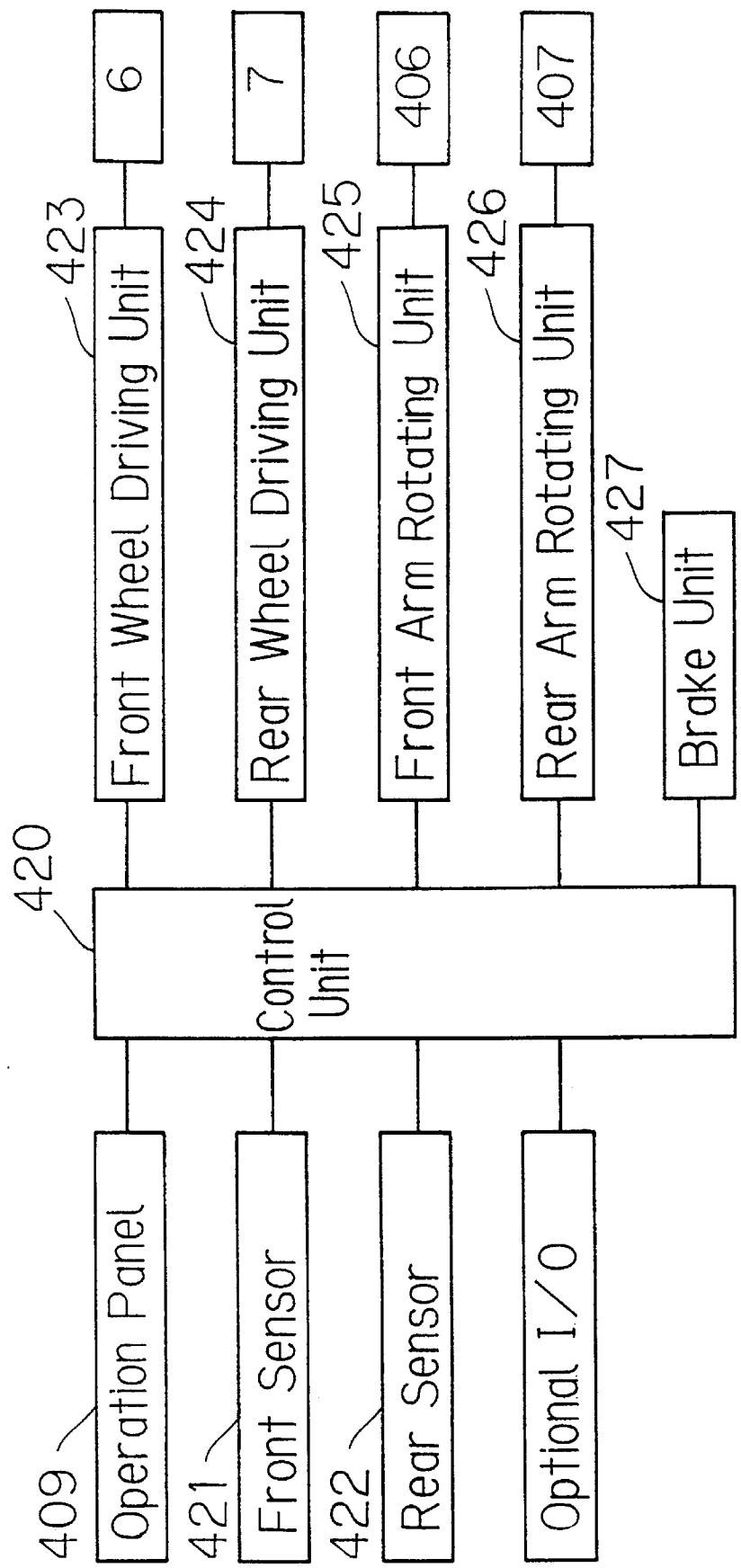
FIG. 26 is a control block diagram of the vehicle depicted in FIG. 24.

The vehicle includes a control unit 420 as shown in FIG. 26. The control unit 420 comprises a microcomputer consisting of a RAM, a ROM, a CPU and associated elements. To the control unit 420 connected are the operation panel 409, a front sensor 421, a rear sensor 422 and other I/O portions. The sensors 421 and 422 detects whether or not each of the wheels 402a, 402b, 403a and 403b abuts the riser portion of stairs, and detects whether or not each of the wheels 402a, 402b, 403a and 403b is coming off the step surface when going down stairs. In addition, connected to the control unit 420 are a front wheel driving unit 423 which is connected to driving motors 6, one driving motor 6 disposed within each of the front wheels 402a and 402b, a rear wheel driving unit 424 which includes driving motors 7, one driving motor disposed within each of the rear wheels 403a and 403b, a front arm driving unit 425 controlling the movement of the driving motor 406 for rotating the front arm 404 in 180° increments, a rear arm driving unit 426 controlling the movement of the driving motor 407 for rotating the rear arm 405 in 180° increments and a brake unit 427.

Figure 27A:
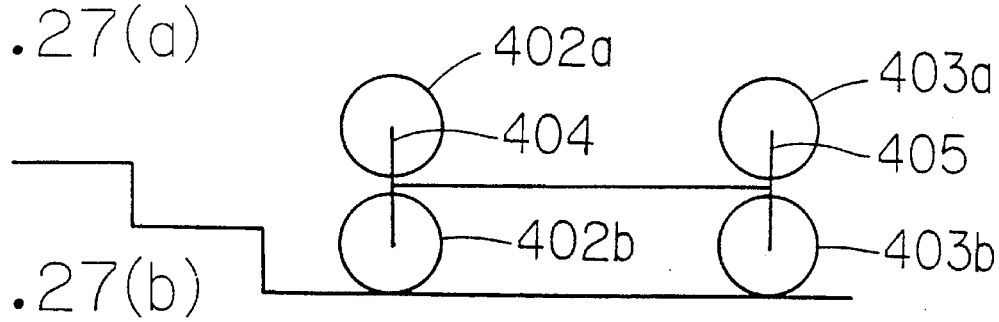
FIGS. 27(a–d) are schematic views of the vehicle depicted in FIG. 24, showing the front wheels of the vehicle ascending a stairstep.
Figure 27B:
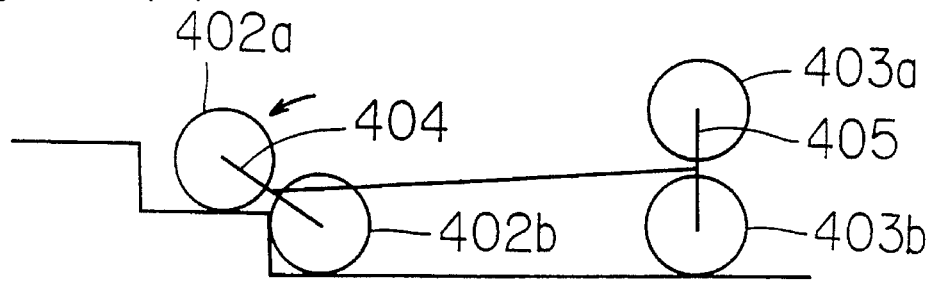
Figure 27C:
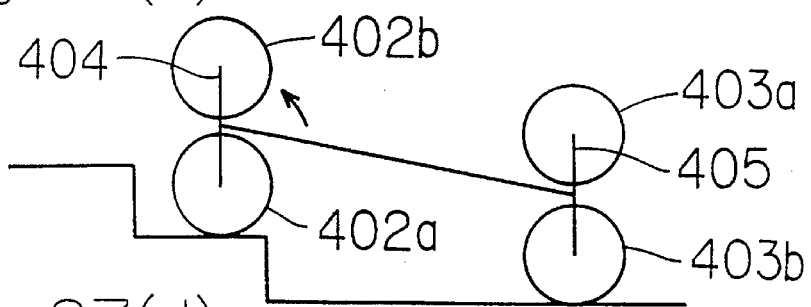
Figure 27D:
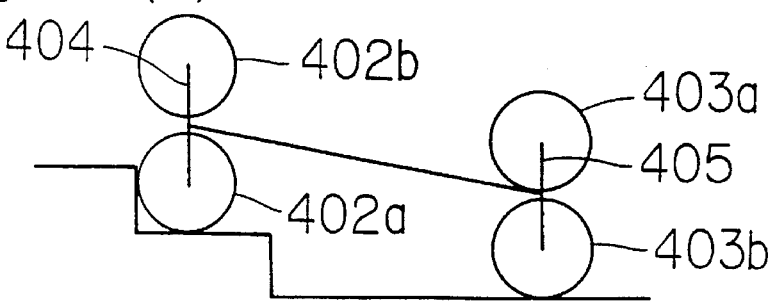
Figure 28A:
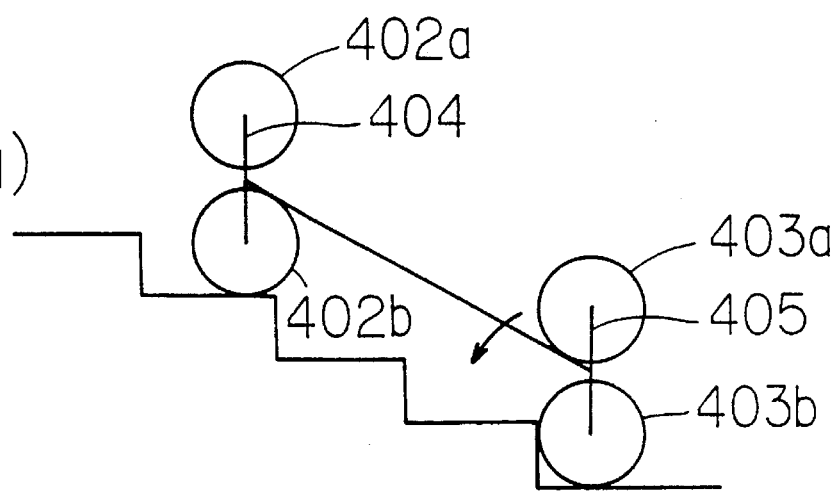
FIG. 28 is a schematic view of the vehicle depicted in FIG. 24 showing the rear wheels of the vehicle ascending a stairstep.
Figure 28B:
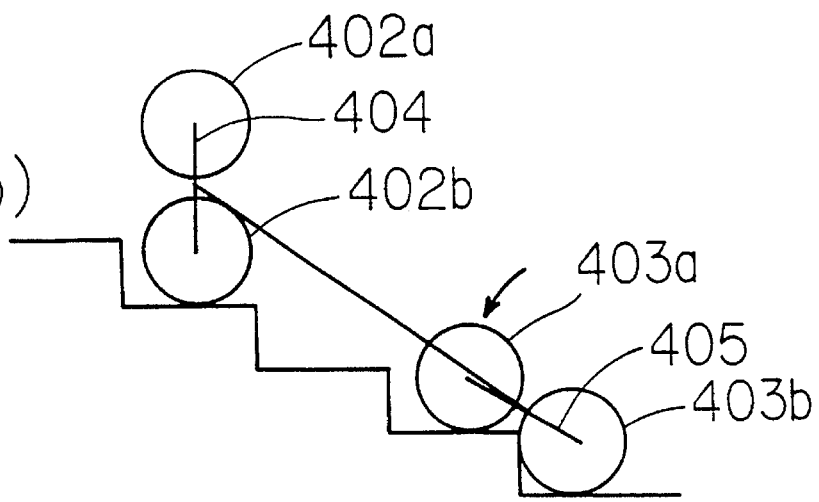
Figure 29:
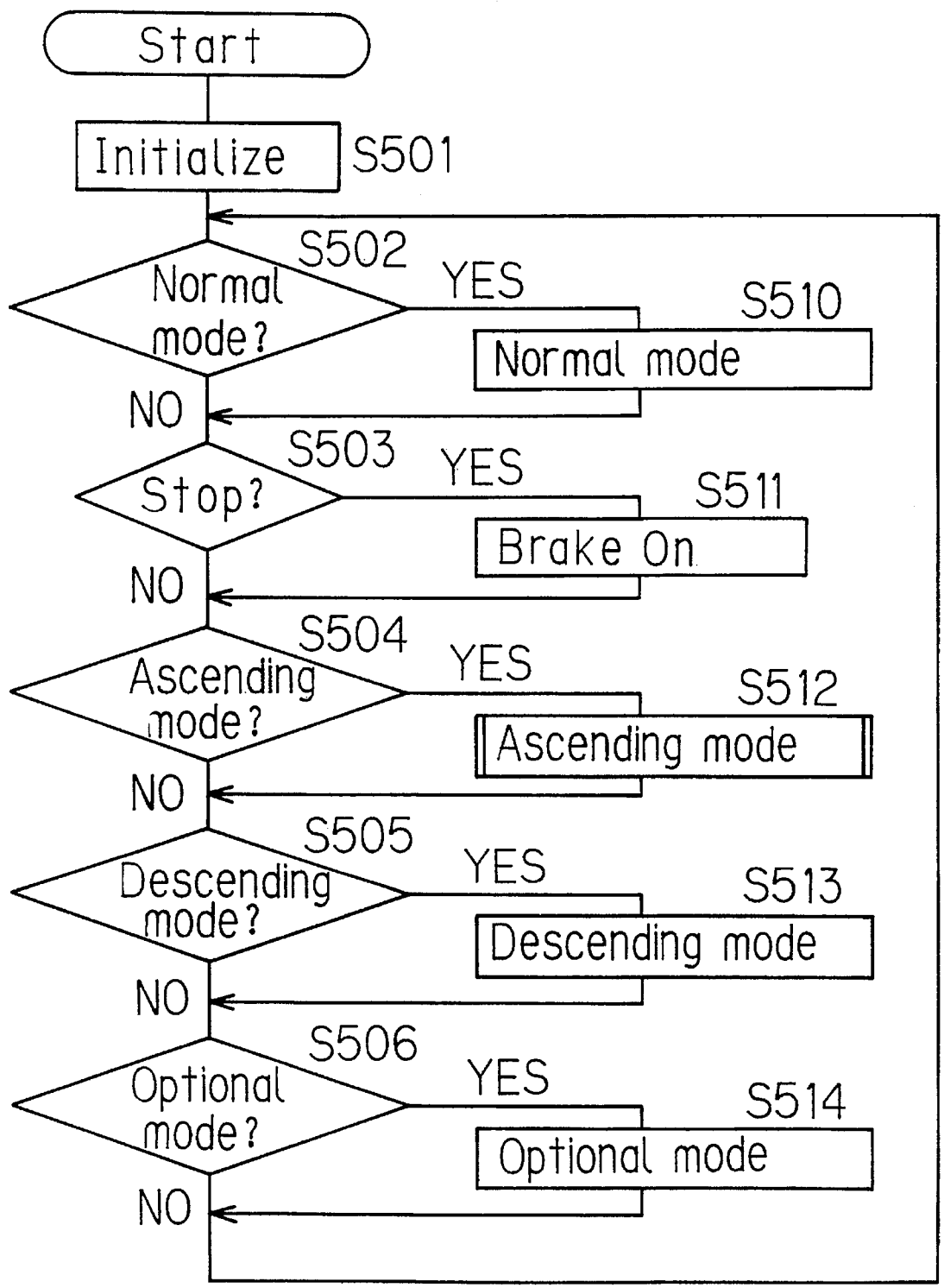
FIG. 29 is an operational flowchart of the vehicle depicted in FIG. 24.

The running control operation will now be described according to control process flowcharts shown in FIGS. 29 and 30 and views shown in FIGS. 27 and 28.

Figure 30:
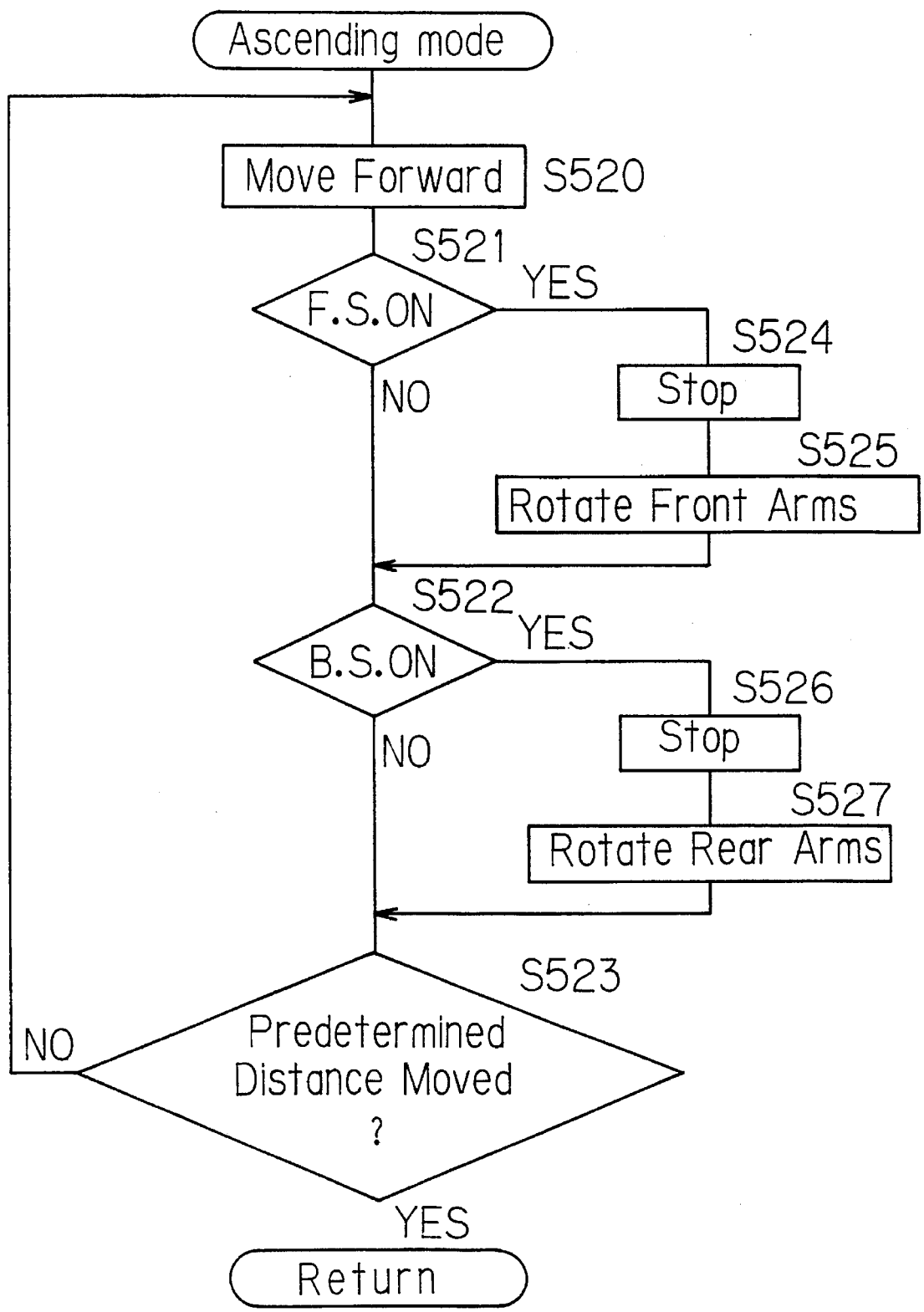
FIG. 30 is an operational flowchart of the vehicle depicted in FIG. 24 in an ascending mode.

When the main switch on the operation panel 409 is turned on, an initialization procedure is carried out at step S501. In the initialization procedure, for example, the running mode is set to the normal running mode. Then, it is determines at step S502 whether the button for specifying the normal running mode has been pressed or not. Then, it is determined at step S503 whether a stop button has been pressed or not. Then, it is determined at step S504 whether a button for ascending stairs has been pressed or not. Then, it is determined at step S505 whether a button for descending stairs has been pressed or not. Then, it is determined at step S506 whether another key has been pressed or not.

Wherein the button selecting the normal running mode has been pressed, the program proceeds from step S502 to step S510, in which the normal running operation is carried out. In the normal running operation, either the front wheels 402 or the rear wheels 403 are driven to go forward or backward. Wherein the stop button has been pressed, the program proceeds from step S503 to step S511, in which the brake unit 431 is driven, whereby the vehicle is stopped. Wherein the ascending mode button has been pressed, the program proceeds from step S504 to step S512, in which an ascending mode operation, to be described later, is carried out. Wherein the descending mode button has been pressed, the program proceeds from step S505 to step S513, in which a descending mode operation is carried out. Wherein an optional key has been pressed, the program proceeds from step S506 to step S514, in which an operation corresponding to the pressed key is carried out. Thus, operations corresponding to each button on the operation panel and manipulation of the lever are carried out until the main switch is turned off.

Wherein the ascending mode has been selected, either the front wheels 402a and 402b or the rear wheels 403a and 403b are driven to go forward at step S520 in FIG. 30. Then, it is determined at step S521 whether the front sensor 421 has been turned on or not. The front sensor 421 detects whether the front wheels 402a and 402b abut on the riser portion of stairs or not. Wherein the determination at step S521 is NO, the program proceeds to step S522. It is determined at step S522 whether the rear sensor 422 has been turned on or not. The rear sensor 422 determines whether the rear wheels 403a and 403b abut on the riser portion of stairs or not. Wherein the determination at step S522 is NO, the program proceeds to step S523. It is determined at step S523 whether the vehicle makes a predetermined distance or not after started to go forward. Wherein the vehicle has made the predetermined distance during the going-up operation while neither the sensor 421 nor 422 has been turned on, it is determined that the vehicle has finished going up stairs. In this case, the determination at step S523 is YES, the going-up operation is completed.

When the front wheel 402b reaches the first riser portion of stairs after the vehicle started to go forward, the front sensor 421 turns on. Then, the determination at step S521 is YES, and the program proceeds to step S524. At step S524, the vehicle is temporarily stopped. Then, the program proceeds to step S525, in which the front arm 404 is rotated as shown in FIG. 27B. Thus, the upper front wheels 402a abut on the upper step surface of stairs and the front arms 404 are further rotated around the front wheels 402a. After the arms are rotated 180° from the above state, it is stopped, as is shown in FIG. 27C. Then, the program returns to step S520, in which the vehicle starts to go forward again. When the front wheels 402a abut on the step difference of stairs as shown in FIG. 27D, the operations at steps S521 to S525 are carried out as described above.

By repeating the above operations, the vehicle goes up stairs while the front wheels 402a and 402b alternately abut on the step surface of stairs. Then, for example, when the rear wheels 403b reach the riser portion of stairs as shown in FIG. 28B, the rear sensor 422 is turned on. In this case, the determination at step S522 is YES and then, the program proceeds from step S522 to step S526. At step S526, the vehicle is temporarily stopped. Then, the program proceeds to step S527, in which the rear arm 405 is rotated. Thus, the rear wheels 403a positioned at the upper portion abut on the upper step surface and then, the rear arms 405 are further rotated around the rear wheels 403a. Then, the arms are rotated 180° from the above state. Thus, the rear wheels 403b go up stairs.

By repeating the above operations, the vehicle can go up stairs while the front and rear arms 404 and 405 are rotated and the wheels are moved.

Wherein the vehicle moves to the flat surface after finished going up stairs, as described above, the determination at step S523 becomes YES and then, the normal running mode is started.

When the descending mode has been selected, as the vehicle goes down stairs, each of sensors 421 and 422 detects a position where each wheel is about to come off the step surface of stairs and operations similar to those conducted in the ascending mode are reversely carried out. More specifically, the front and rear arms 404 and 405 are reversely rotated as compared with the above, according to the detected result of each sensor to go down stairs.

According to the above embodiment of the present invention, the vehicle can go up and down stairs without damaging a corner portion of the step surface of stairs. In addition, since there are provided only two pairs of wheels on each side of the front and rear portions of the vehicle body, its structure is simple. Furthermore, since there are few elements to be controlled, controlling operation when the vehicle goes up and down stairs is simple. Still further, since only two wheels are mounted to each of arms 404 and 405, a diameter of each wheel can be large as compared with a case where a wheel is disposed at each apex of a triangle, whereby stable running can be implemented.

In addition, since the front and rear arms 404 and 405 can be rotated according to the above embodiment of the present invention, the wheel base can be varied by changing a rotation angle of the arms 404 and 405. Furthermore, if the arms 404 and 405 are rotated 90° from a position shown in FIG. 24 and maintained as it is, a height of the vehicle can be low so that the vehicle can go up and down stairs easily and eight-wheel running becomes possible, whereby the running operation can be stable.

The angle between the vehicle body and the seat may be variable so as to maintain the seat in the horizontal state while the vehicle goes up and down stairs by a seat leveling mechanism (not shown).

It should also be appreciated that, as depicted in FIG. 24, the wheels 402b and 403b serve as front and rear wheels, respectively, and wheels 402a and 403b serve as auxiliary wheels. However, after rotation or pivoting of the arms 404 and 405, the wheels 402b and 403b become auxiliary wheels and the wheels 402a and 403a become the front and rear wheels, respectively.

Various details of the invention may be changed without departing from its spirit nor its scope. Furthermore, the foregoing description of the embodiments according to the present invention is provided for the purpose of illustration only, and not for the purpose of limiting the invention as defined by the appended claims and their equivalents.

What is claimed is:

1. A vehicle for going up and down stairs comprising:
   a generally horizontal, rigid vehicle body having a seat attached thereto;
   a pair of rigid elongated front arms having opposing ends mounted to said vehicle body proximate to a front end of said vehicle body, each of said pair of front arms rigidly fixed to one of a pair of front central shafts, each of said central shafts supported on said vehicle body;
   a pair of rigid elongated rear arms having opposing ends mounted to said vehicle body proximate to a rear end of said vehicle body, each of said pair of rear arms rigidly fixed to one of a pair of central shafts, each of said central shafts supported on said vehicle body;
   a plurality of pairs of generally parallel axles, each axle being supported at each end of said opposing ends on each one of said front arms and said rear arms;
   a plurality of wheels, one wheel supported on each of said axles;
   driving means for selectively powering each of said wheels;
   sensing means associated with the front of said vehicle body and the rear of said vehicle body for sensing wheel proximity to obstructions to horizontal movement of said vehicle body;
   a rotating means for selectively rotating said central shafts in 180° increments; and
   a control unit connected to said driving means, said rotating means and said sensing means for controlling said driving means and said rotating means in response to said sensing means.

2. A vehicle for ascending and descending a stairway, comprising:
   a chassis;
   a seat rigidly mounted onto said chassis;
   at least one rigid elongated wheel-retaining shank having opposing ends supported at a first end of said chassis so as to be centrally rotatable;
   at least a pair of rigid elongated wheel-retaining shanks having opposing ends supported along a second end of said chassis so as to be centrally rotatable;
   wheels of like pairs carried by each of said wheel-retaining shanks at the opposing ends thereof;
   driving means for selectively driving said wheels, and for rotating said wheel-retaining shanks through half-revolution increments;
   sensing means associated with said first end of said chassis and said second end of said chassis, for detecting wheel proximity to a stair riser and for detecting a predetermined drop in upward force on a wheel; and
   a control unit connected to said driving means and to said sensing means, for controlling said driving means in response to said sensing means.

* * * * *